(12) United States Patent
Matsunaga

(10) Patent No.: US 9,484,655 B2
(45) Date of Patent: Nov. 1, 2016

(54) CONNECTOR

(71) Applicant: JAPAN AVIATION ELECTRONICS INDUSTRY, LIMITED, Shibuyaku, Tokyo (JP)

(72) Inventor: Akihiro Matsunaga, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 196 days.

(21) Appl. No.: 14/285,431

(22) Filed: May 22, 2014

(65) Prior Publication Data

US 2015/0011118 A1 Jan. 8, 2015

(30) Foreign Application Priority Data

Jul. 2, 2013 (JP) ................................. 2013-138930

(51) Int. Cl.
| | |
|---|---|
| H01R 13/60 | (2006.01) |
| H01R 13/22 | (2006.01) |
| G06K 7/00 | (2006.01) |
| G06K 13/08 | (2006.01) |
| H01R 13/15 | (2006.01) |
| H01R 13/633 | (2006.01) |

(52) U.S. Cl.
CPC ............. *H01R 13/22* (2013.01); *G06K 7/0021* (2013.01); *G06K 13/0831* (2013.01); *H01R 13/15* (2013.01); *H01R 13/633* (2013.01)

(58) Field of Classification Search
CPC ...................................................... H01R 13/22
USPC ........................................ 439/527, 946, 945
See application file for complete search history.

(56) References Cited

U.S. PATENT DOCUMENTS

| | | | |
|---|---|---|---|
| 5,743,766 A | 4/1998 | Kaneshige et al. | |
| 6,101,372 A * | 8/2000 | Kubo | H04B 1/3816 439/354 |
| 6,580,923 B1 * | 6/2003 | Kubo | H04B 1/3816 361/814 |

(Continued)

FOREIGN PATENT DOCUMENTS

| | | |
|---|---|---|
| CN | 102544793 A | 7/2012 |
| CN | 102637983 A | 8/2012 |

(Continued)

OTHER PUBLICATIONS

Chinese Office Action (and machine English translation thereof) dated Dec. 28, 2015, issued in counterpart Chinese Application No. 201410311307.3.

*Primary Examiner* — Abdullah Riyami
*Assistant Examiner* — Nader Alhawamdeh
(74) *Attorney, Agent, or Firm* — Holtz, Holtz & Volek PC

(57) ABSTRACT

A connector that reduces damage of a contact portion of a contact, caused by a frame portion of a card holder when the frame portion is inserted into or extracted from a holder accommodating portion of a connector main body. A connector includes a card holder that includes a frame portion having a card accommodating portion for accommodating a card, and a connector main body that is mounted on a printed substrate and has a holder accommodating portion for accommodating the card holder. The frame portion is provided with inclined portions for suppressing deformation of contact portions of contacts protruding into the holder accommodating portion, caused by a front side of the frame portion when the card holder is inserted into or extracted from the holder accommodating portion.

17 Claims, 44 Drawing Sheets

(56) References Cited

U.S. PATENT DOCUMENTS

| | | | | |
|---|---|---|---|---|
| 7,255,603 B2* | 8/2007 | Kato | ............... | H01R 12/721 |
| | | | | 439/630 |
| 7,925,301 B2* | 4/2011 | Kubo | ............... | H04B 1/3816 |
| | | | | 361/814 |
| 9,001,501 B2 | 4/2015 | Takasaki et al. | | |
| 2003/0195020 A1* | 10/2003 | Kubo | ............... | H04B 1/3816 |
| | | | | 455/575.1 |
| 2011/0151946 A1* | 6/2011 | Kubo | ............... | H04B 1/3816 |
| | | | | 455/575.1 |
| 2015/0011118 A1* | 1/2015 | Matsunaga | ............ | H01R 13/15 |
| | | | | 439/527 |

FOREIGN PATENT DOCUMENTS

| | | |
|---|---|---|
| CN | 203014023 U | 6/2013 |
| JP | 08-321353 A | 12/1996 |

* cited by examiner

CONNECTOR

BACKGROUND OF THE INVENTION

1. Field of the Invention

This invention relates to a connector, and more particularly to a connector for a plate-like connection object, such as a SIM card.

2. Description of the Related Art

Conventionally, as shown in FIGS. 42 to 44, there has been proposed a connector for a card, which comprises a housing main body 902 and a card holder 903 (see Japanese Laid-Open Patent Publication (Kokai) No. H08-321353, FIGS. 3, 5, and 6, Paragraphs 0013 to 0016, 0018, 0020 to 0022).

As shown in FIG. 42, a plurality of connection terminals 905 are mounted on a flat surface 904 of the housing main body 902 made of synthetic resin. The housing main body 902 is mounted on a printed circuit board (not shown). A contact portion 906 of each connection terminal 905 protrudes from the flat surface 904 (see FIG. 43). A tail 907 (see FIG. 42) of each connection terminal 905 is soldered to a connection pad (not shown) of the printed circuit board.

As shown in FIG. 42, the flat surface 904 is formed with groove walls 910 at respective opposite sides thereof in a direction D1 of arranging the connection terminals 905. The two groove walls 910 are each formed with a groove 909, and the grooves 909 are opposed to each other in the arranging direction D1. One of the groove walls 910 is formed with a cutout 911A, and the other of the groove walls 910 is formed with a cutout 911B.

As shown in FIG. 44, the card holder 903 has a substantially square shape, as viewed from directly above. A card accommodating portion 918 is formed on a reverse surface 917 of the card holder 903.

One of the four sides of the card holder 903 is provided with a holding portion 923, and the other three sides of the same are provided with edge portions 925A, 925B, and 925C, respectively. An engagement protrusion 927A which protrudes outward is formed on the edge portion 925A, and an engagement protrusion 927B which protrudes outward is formed on the edge portion 925B. A card presser 922 formed by a pair of cantilever beams 921 which protrude into the card accommodating portion 918 is provided on the edge portion 925B. The card presser 922 urges a card (not shown) against the edge portion 925A, and hence the card is prevented from being removed even when the card accommodating portion 918 is directed downward.

To mount the card holder 903 on the housing main body 902, first, the reverse surface 917 of the card holder 903 is caused to face toward the flat surface 904 of the housing main body 902, the engagement protrusion 927A of the edge portion 925A is aligned with the cutout 911B of the groove wall 910, the engagement protrusion 927B of the edge portion 925B is aligned with the cutout 911A of the groove wall 910, and then the card holder 903 is dropped such that the reverse surface 917 of the card holder 903 is brought into contact with the flat surface 904 of the housing main body 902. Next, the card holder 903 is slightly slid in a direction indicated by an arrow 930. As a result, circuit contacts of the card are brought into contact with the contact portions 906 of the housing main body 902, whereby the card and the printed circuit board are electrically connected to each other.

Besides the above-described tray connector for a card, there is also a known connector for a card, not shown. This connector includes a tray card holder and a connector main body having a card holder-accommodating portion for accommodating the card holder, and is configured to have a structure for having a card inserted into the card holder-accommodating portion, from a holder slot located at a front side of the connector main body toward a rear side of the connector main body.

In recent years, the connector of this type has also been provided with a so-called multi-core structure and been reduced in size, and contact portions of contacts thereof have been provided at locations closer to the holder slot of the connector main body of the connector.

Therefore, when a tray card holder with no card held therein is inserted from the holder slot of the connector main body into the card holder-accommodating portion while swinging the card holder from side to side, any of the contact portions of the contacts, protruding into the card holder-accommodating portion, may be plastically deformed and damaged by a front side portion of the tray card holder.

Further, also when the tray card holder with no card held therein is extracted from the card holder-accommodating portion, any of the contact portions of contacts, protruding into the card holder-accommodating portion, may be plastically deformed and damaged by the front side portion of the tray card holder.

SUMMARY OF THE INVENTION

The present invention has been made in view of these circumstances, and an object thereof is to reduce, when a frame portion of a holder is inserted into or extracted from a holder accommodating portion of a connector main body, damage of contact portions of contacts, caused by the frame portion.

To attain the above object, the present invention provides a connector that electrically connects between a plate-like connection object and another connection object, comprising a holder that includes a frame portion forming a plate-like connection object-accommodating portion for accommodating the plate-like connection object, and a connector main body that is mounted on the other connection object, and includes a holder accommodating portion for accommodating the holder, wherein the connector main body includes a housing and contacts that are held in the housing, wherein each of the contacts includes a connection portion that is connected to the other connection object, and a contact portion that protrudes into the holder accommodating portion, and is brought into contact with the plate-like connection object accommodated in the plate-like connection object-accommodating portion when the holder is accommodated in the holder accommodating portion, and wherein the frame portion is provided with deformation suppressing portions for suppressing deformation of the contact portion, caused when the holder is inserted into or extracted from the holder accommodating portion.

Preferably, the deformation suppressing portions are provided on a front side of the frame portion in a holder inserting direction in which the holder is inserted into the holder accommodating portion.

Preferably, the deformation suppressing portions are provided on a front side and a rear side of the frame portion in a holder inserting direction in which the holder is inserted into the holder accommodating portion.

Preferably, the deformation suppressing portions are provided on a front surface and a reverse surface of the frame portion.

Preferably, the deformation suppressing portions are inclined portions that are inclined in a front-rear direction or a left-right direction of the frame portion as viewed in a holder inserting direction in which the frame portion is inserted into the holder accommodating portion.

Preferably, wherein the deformation suppressing portions are inclined portions that are inclined in a front-rear direction or a left-right direction of the frame portion, and grooves which are semi-circular in cross-section and extend in the front-rear direction, as viewed in a holder inserting direction in which the frame portion is inserted into the holder accommodating portion.

Preferably, wherein the holder includes a spring portion that supports the plate-like connection object by urging the plate-like connection object accommodated in the plate-like connection object-accommodating portion against an inner peripheral surface of the frame portion.

More preferably, the spring portion is plate-shaped, and is provided with a spring portion-side inclined portion at a location close to a free end thereof, for guiding the plate-like connection object out of the plate-like connection object-accommodating portion when the plate-like connection object is obliquely accommodated into the plate-like connection object-accommodating portion.

Preferably, the holder includes a supporting portion that is provided on the frame portion, for supporting a peripheral portion of the plate-like connection object accommodated in the plate-like connection object-accommodating portion.

Preferably, the holder includes a bottom portion that is provided on the frame portion, and is opposed to the plate-like connection object accommodated in the plate-like connection object-accommodating portion.

Preferably, the holder includes an operation portion that is provided on a rear side of the frame portion in a holder inserting direction in which the frame portion is inserted into the holder accommodating portion, for inserting and extracting the frame portion into and out of the holder accommodating portion, and a recess for hooking a jig for extracting the frame portion out of the holder accommodating portion is formed in the vicinity of the operation portion.

According to the present invention, it is possible to reduce, when the frame portion of the holder is inserted into or extracted from the holder accommodating portion of the connector main body, damage of the contact portion of the contact, caused by the frame portion.

The above and other objects, features and advantages of the present invention will become more apparent from the following detailed description taken in conjunction with the accompanying drawings.

DETAILED DESCRIPTION OF THE PREFERRED EMBODIMENT

The present invention will now be described in detail with reference to the drawings showing preferred embodiments thereof.

As shown in FIGS. 1 to 5, a connector 1 according to a first embodiment of the present invention comprises a connector main body 3 and a card holder (holder) 5 which is connected to the connector main body 3 in a state holding a card (plate-like connection object) 20.

Figure 14:
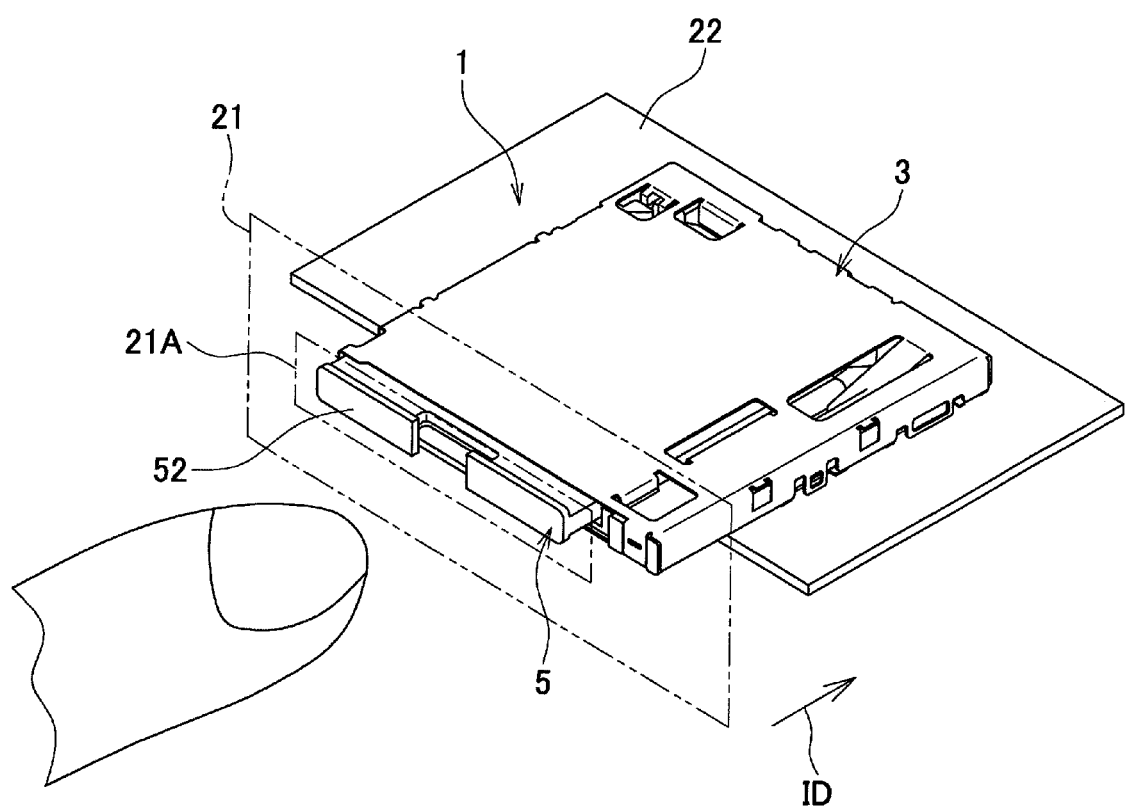
FIG. 14 is a view showing a relationship between an operation portion of the card holder inserted into the holder accommodating portion of the connector main body shown in FIG. 1 and an insertion slot of a casing in which the connector main body is accommodated.

The connector main body 3 is, as shown in FIG. 14, mounted on a printed circuit board (the other connection object) 22 fixed in a casing 21. FIG. 14 partially shows the casing 21 and the printed circuit board 22 for convenience of explanation of the embodiments of the present invention. The connector 1 electrically connects between the card 20 (see FIG. 2) held by the card holder 5 and the printed circuit board 22 (see FIG. 14). The card 20 includes a memory card, such as a SD (Secure Digital) card and a SIM (Subscriber Identity Module) card (type with no IC chip), an IC (integrated circuit) card, and so forth.

As shown in FIGS. 1 to 5, the connector main body 3 comprises a housing 2 made of resin, a shell 32 made of metal, which covers the housing 2, a holder accommodating portion 33 for accommodating the card holder 5, contacts 6 held in the housing 2, and an ejection mechanism 34 for ejecting the card holder 5 from the casing 21 (see FIG. 14) to the outside. In the present embodiment, as the ejection mechanism 34, a well-known ejection mechanism of a so-called push-in/push-out type is used, and hence detailed description thereof is omitted.

The holder accommodating portion 33 (see FIGS. 1 and 2) of the connector main body 3 is a space surrounded by the housing 2 and the shell 32, where a frame portion 51 of the card holder 5 is accommodated.

Figure 5:
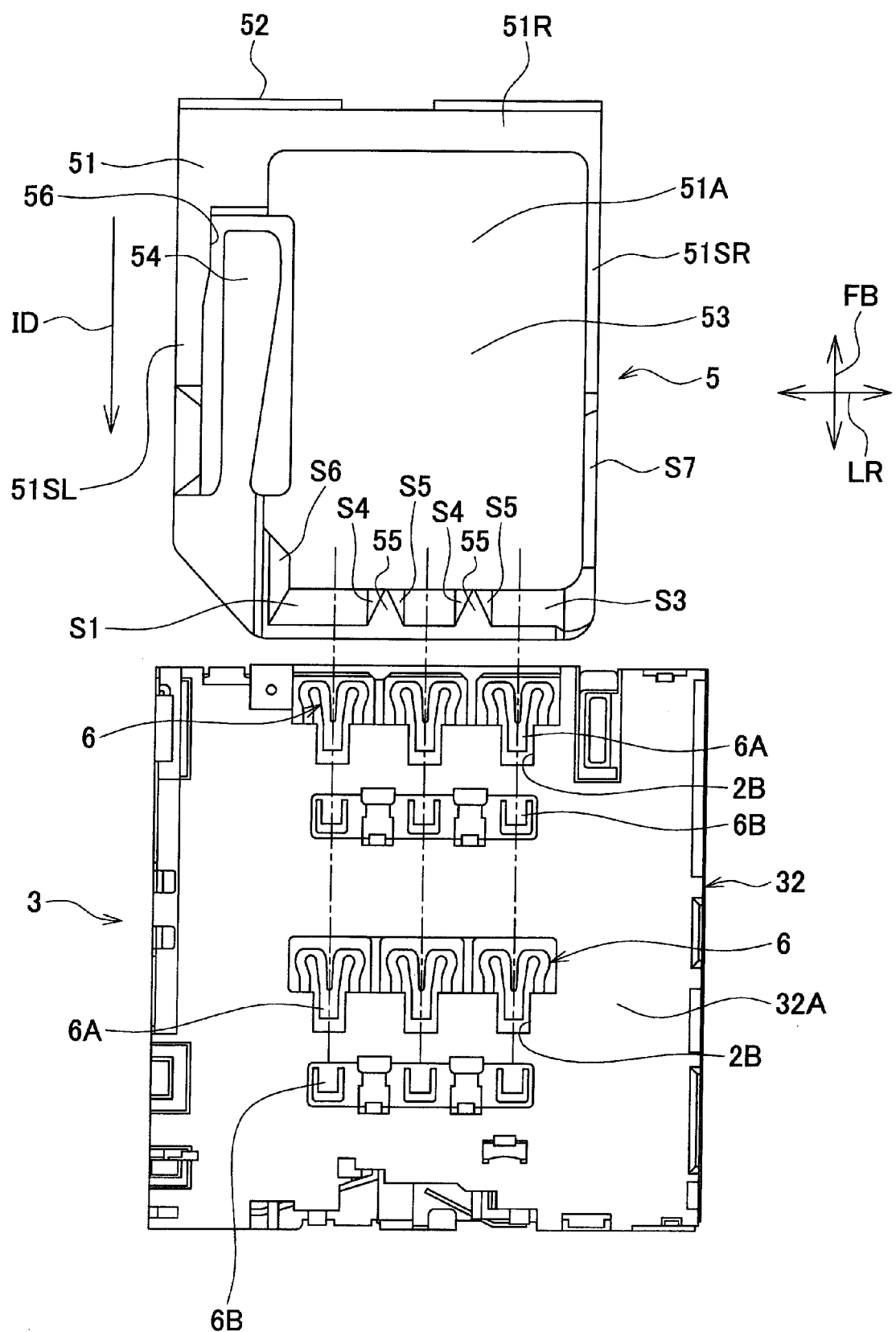
FIG. 5 is a perspective view of the connector shown in FIG. 1, as viewed from directly below, in the state before the card holder is inserted into the holder accommodating portion of the connector main body.
Figure 6:
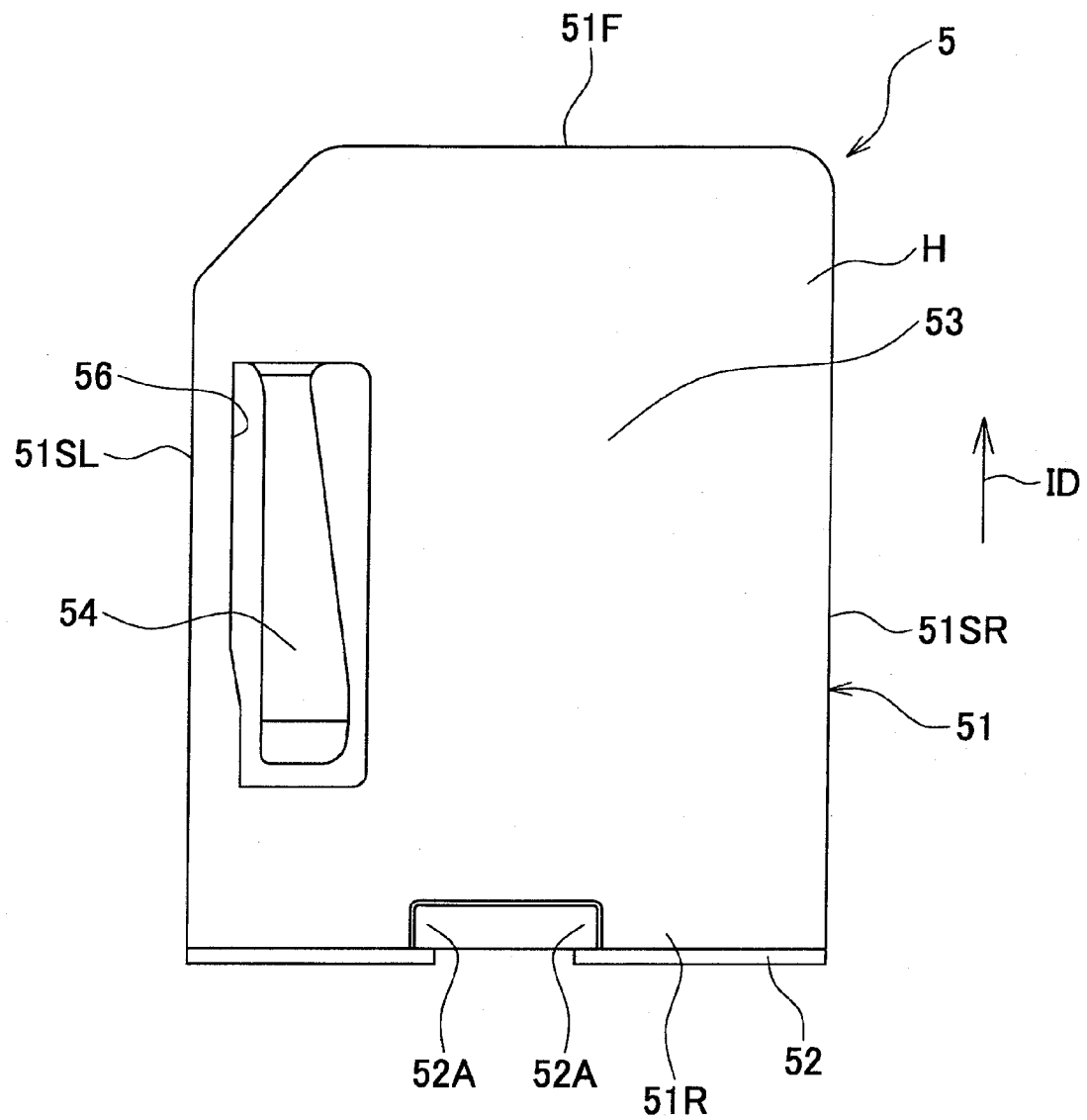
FIG. 6 is a view of a front surface of the card holder of the connector shown in FIG. 1.
Figure 12:
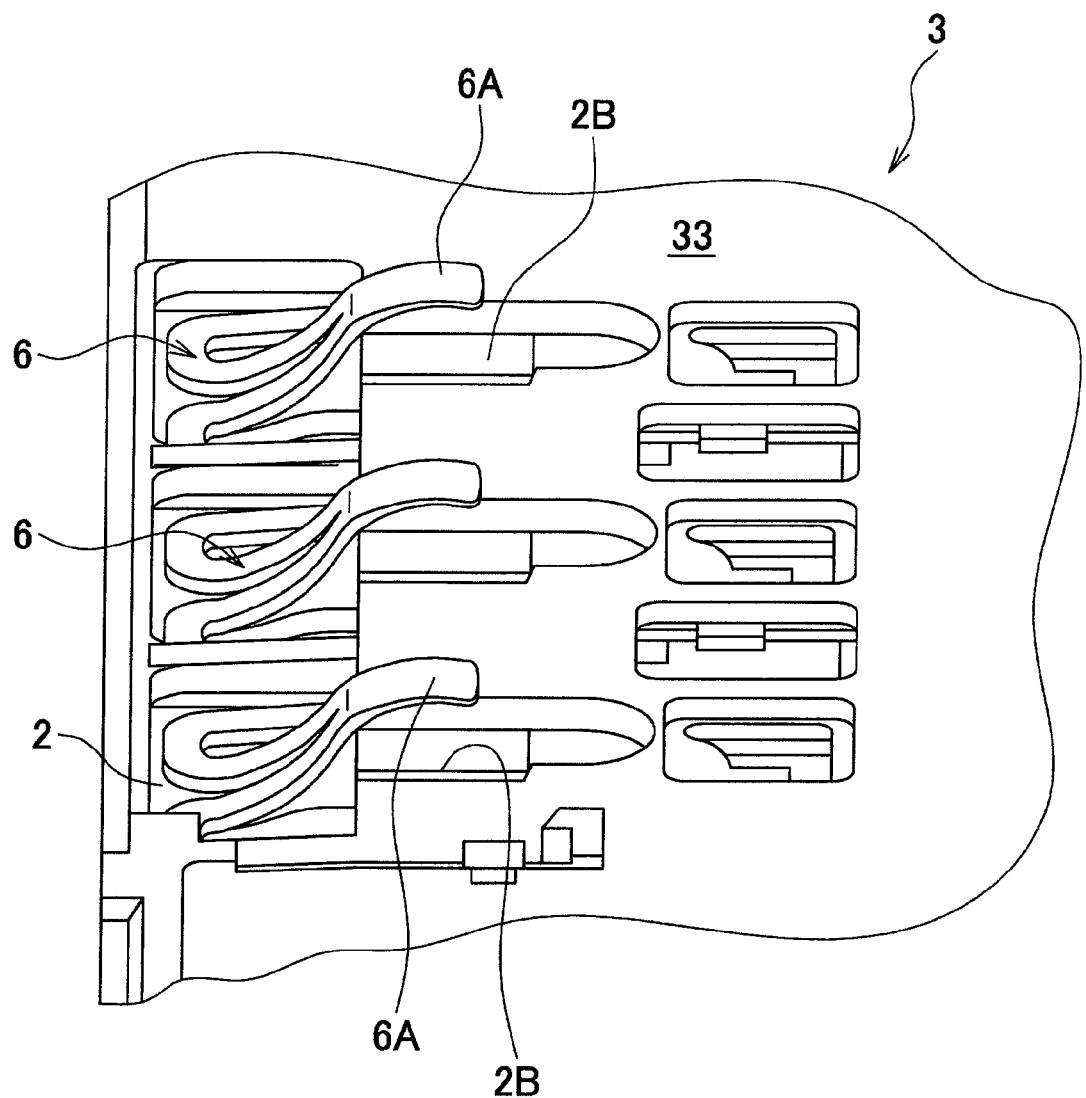
FIG. 12 is a perspective view of a contact part of the connector shown in FIG. 1 with a shell removed from the connector main body.

Each contact 6 includes, as shown in FIGS. 5 and 12, a contact portion 6A which is brought into contact with an electrode 20A of the card 20, and a connection portion 6B which is connected to a pad (not shown) of the printed circuit board 22 (see FIG. 14). The contact portion 6A protrudes into the holder accommodating portion 33 (see FIG. 12). The connection portion 6B is exposed from a lower surface 32A of the connector main body 3 to the outside such that the connection portion 6B can be soldered to the pad of the printed circuit board 22 (see FIGS. 2, 4, and 5). The housing 2 is formed with escape holes 2B for allowing the contact portions 6A to escape therein when the frame portion 51 is accommodated in the holder accommodating portion 33.

As shown in FIGS. 6 to 11, the card holder 5 comprises the frame portion 51 having a card accommodating portion (plate-like connection object-accommodating portion) 51A for accommodating the card 20, a bottom portion 53 which is opposed to the card 20 accommodated in the card accommodating portion 51A, an operation portion 52 which is linked to a rear end of the frame portion 51 in a holder inserting direction ID, and a spring portion 54 which urges the card 20 accommodated in the card accommodating portion 51A against an inner peripheral surface of the frame portion 51. The frame portion 51, the bottom portion 53, the operation portion 52, and the spring portion 54 are integrally formed of synthetic resin.

As shown in FIGS. 5 to 8, the frame portion 51 is a substantially rectangular frame. A front surface H (surface from which the card accommodating portion 51A cannot be viewed) of the frame portion 51 is formed with the bottom portion 53, and hence the card holder 5 has a tray structure.

The frame portion 51 includes a front portion 51F, a side portion 51SR, a side portion 51SL, and a rear portion 51R.

The spring portion 54 is provided at the side portion 51SL of the frame portion 51. The spring portion 54 is a spring having a long and narrow plate shape extending in the holder inserting direction ID. The spring portion 54 is accommodated in a spring accommodating chamber 56 formed in the side portion 51SL of the frame portion 51 in an elastically deformable manner. A free end of the spring portion 54 is slightly inserted into the card accommodating portion 51A (see FIG. 5).

The operation portion 52 is a portion which is pushed with a finger when the frame portion 51 is inserted into the holder accommodating portion 33, or is pinched with fingers when the frame portion 51 is drawn out of the holder accommodating portion 33.

Figure 15:
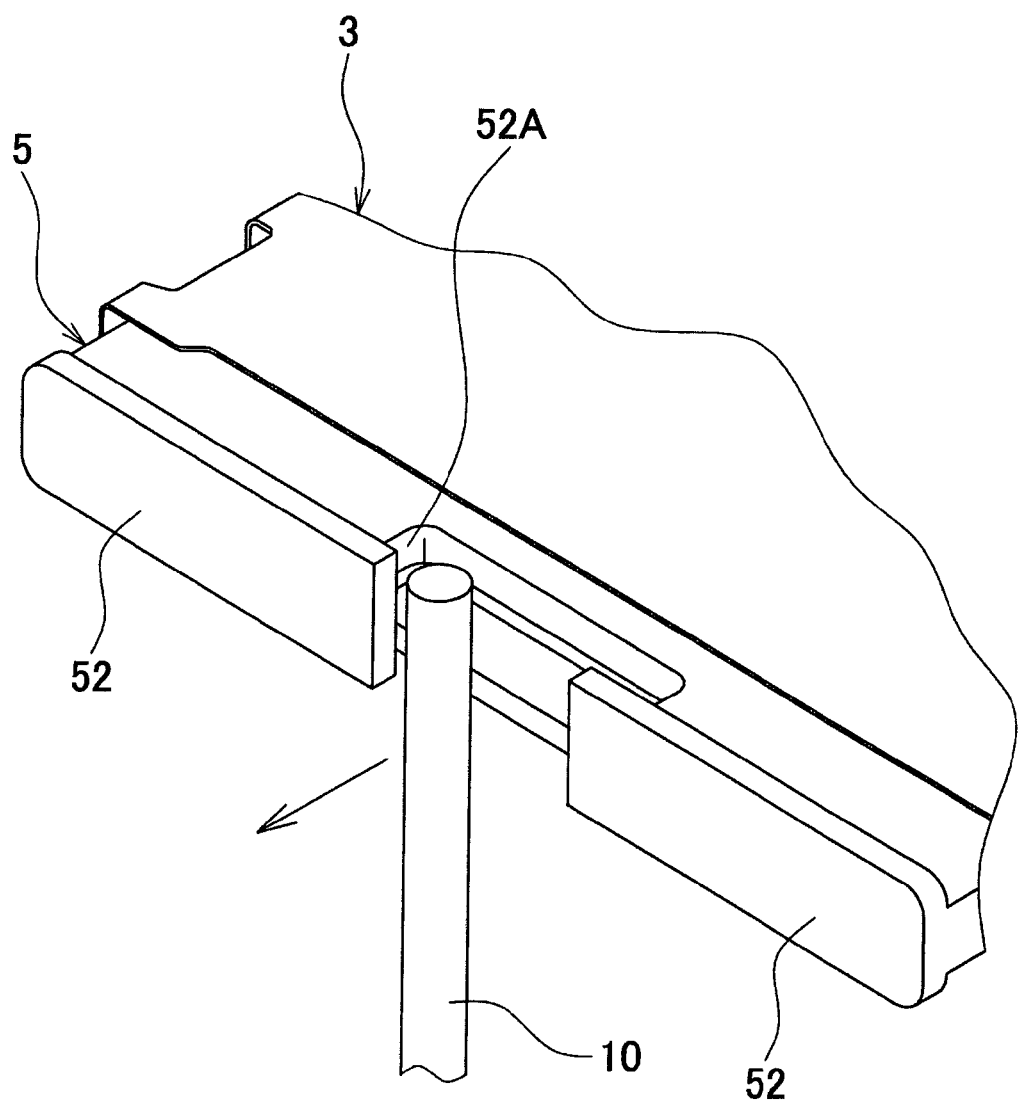
FIG. 15 is a view useful in explaining an operation for extracting the card holder from the connector main body by hooking a pin-shaped tool on an end portion of the operation portion of the card holder.

An frame portion-side end of the frame portion 51 in the vicinity of a central portion of the operation portion 52 is formed with a recess 52A. When it is difficult to extract the frame portion 51 from the holder accommodating portion 33 in a manner pinching the operation portion 52 with fingers, as shown in FIG. 15, the card holder 5 can be extracted by inserting a front end portion of a pin-shaped tool 10 in the recess 52A, and hooking the tool 10 on an end portion of the operation portion 52. Note that a portion on which the front end of the pin-shaped tool 10 is hooked may be provided on the frame portion 51. Further, if the frame portion 51 has enough room for length in a front-rear direction FB of the frame portion 51 (hereinafter referred to as the front-rear direction FB) and the operation portion 52 can be increased in thickness in the front-rear direction FB, the recess 52A may be formed in the operation portion 52.

As shown in FIGS. 7 to 10, the front portion 51F of the frame portion 51 is provided with inclined portions (deformation suppressing portions) S1, S2, and S3. The inclined portions S1, S2, and S3 are inclined in the front-rear direction FB, respectively. Card receiving portions 55 for receiving a peripheral portion of the card 20 accommodated in the card accommodating portion 51A are formed between the inclined portions S1 and S2, and between the inclined portions S2 and S3, respectively. Inclined portions (deformation suppressing portion) S4 and S5 are formed on the card receiving portions 55, respectively. The inclined portions S4 and S5 are inclined in a left-right direction LR of the frame portion 51 (hereinafter referred to as the left-right direction LR).

A front side of the side portion 51SL of the frame portion 51 is formed with an inclined portion (deformation suppressing portion) S6. The inclined portion S6 is inclined in the left-right direction LR.

A front side of the side portion 51SR of the frame portion 51 is formed with an inclined portion (deformation suppressing portion) S7. The inclined portion S7 is inclined in the left-right direction LR.

Note that in the present embodiment, an area A1 (see FIG. 8) in which the front portion 51F of the frame portion 51, the front side of the side portion 51SL, and the front side of the side portion 51SR are located corresponds to the front side of the frame portion 51.

Figure 7:
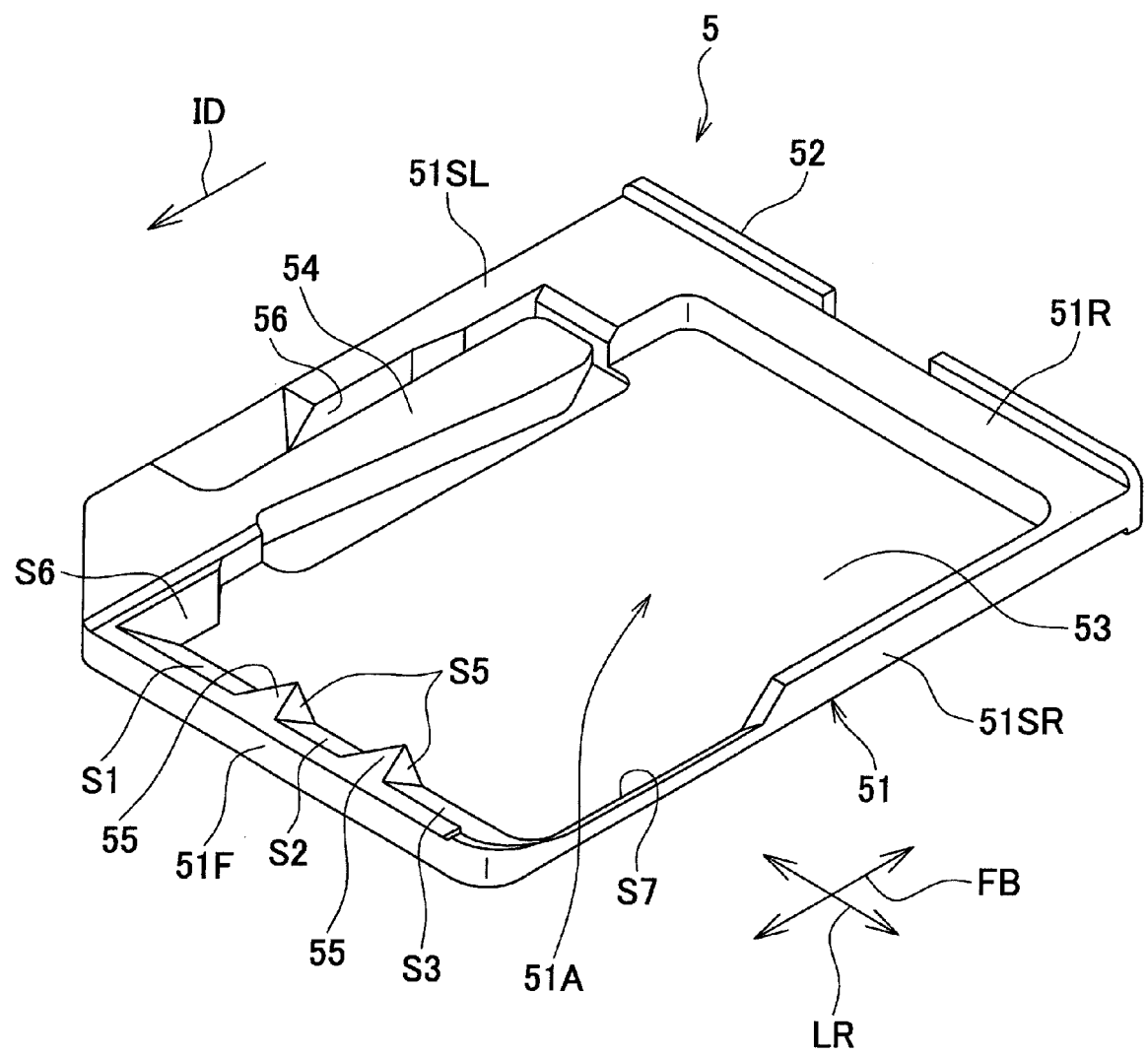
FIG. 7 is a perspective view of a reverse surface side of the card holder of the connector shown in FIG. 1.
Figure 8:
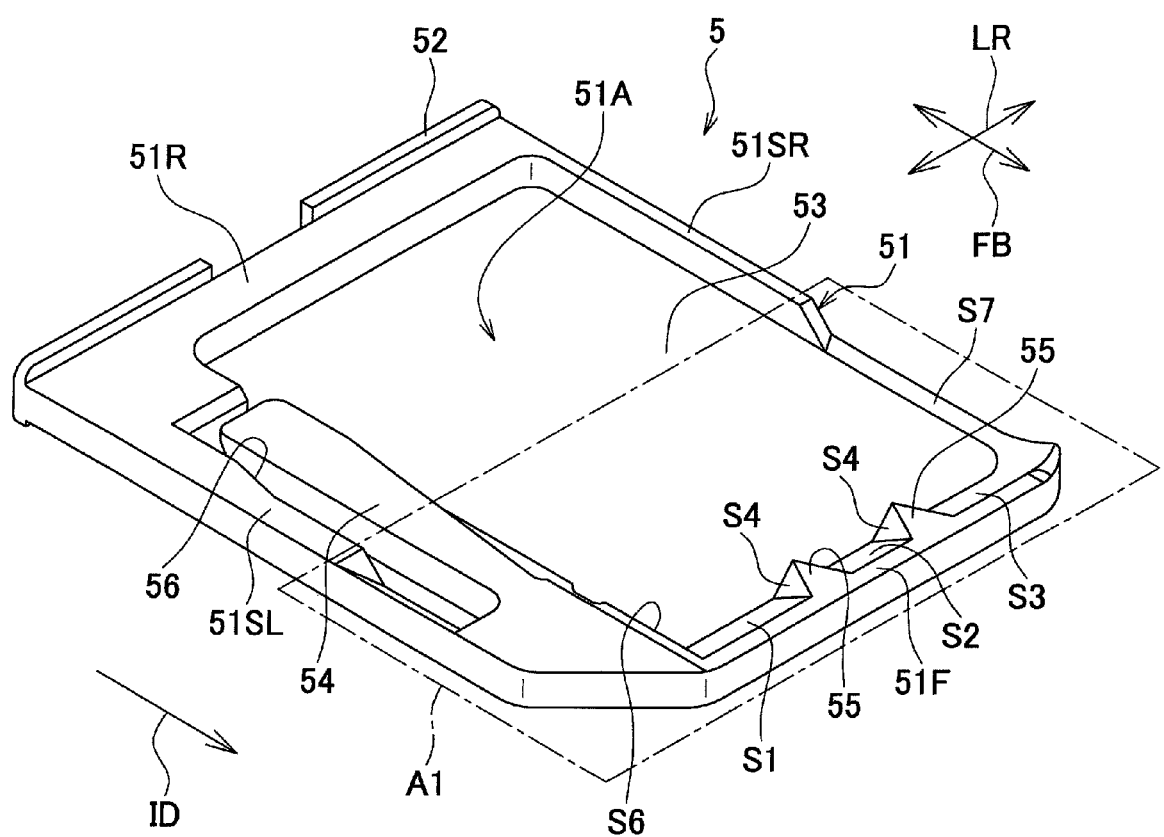
FIG. 8 is a perspective view of the reverse surface side of the card holder of the connector shown in FIG. 1, as viewed from an angle different from FIG. 7.
Figure 9:
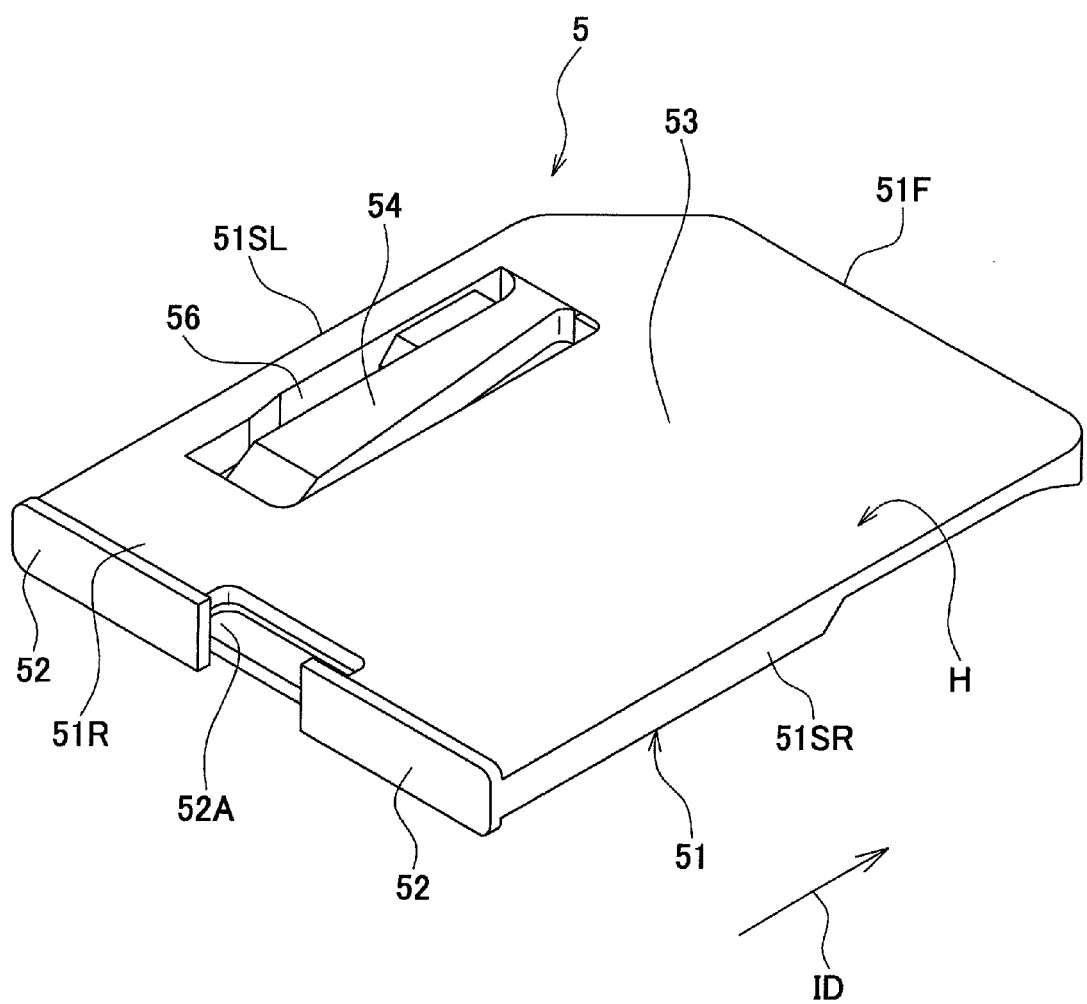
FIG. 9 is a perspective view of a front surface side of the card holder of the connector shown in FIG. 1.
Figure 10:
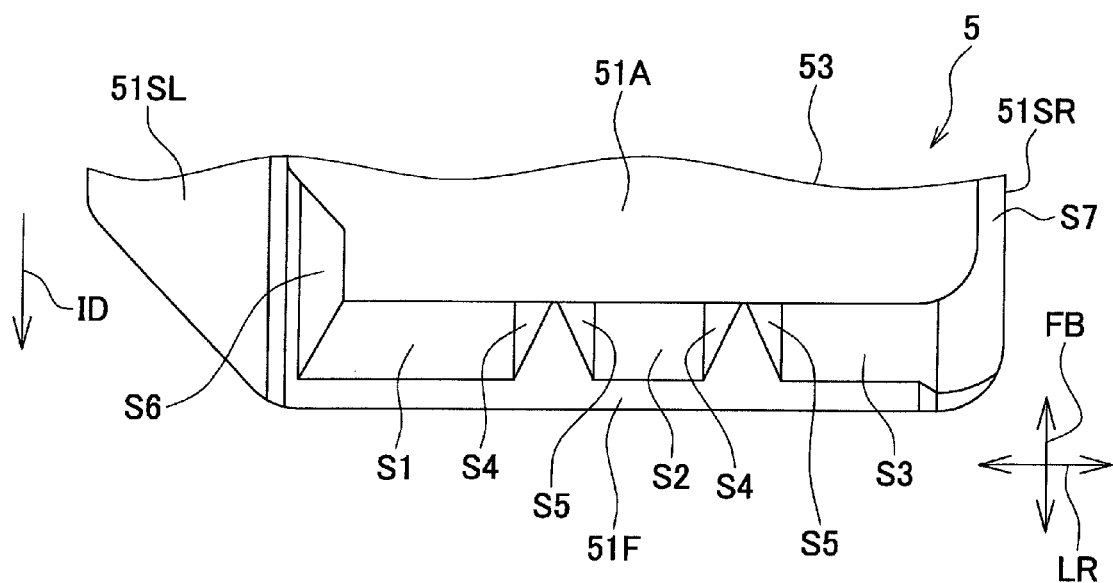
FIG. 10 is a view of a front side portion of the reverse surface of the card holder of the connector shown in FIG. 1.
Figure 11:
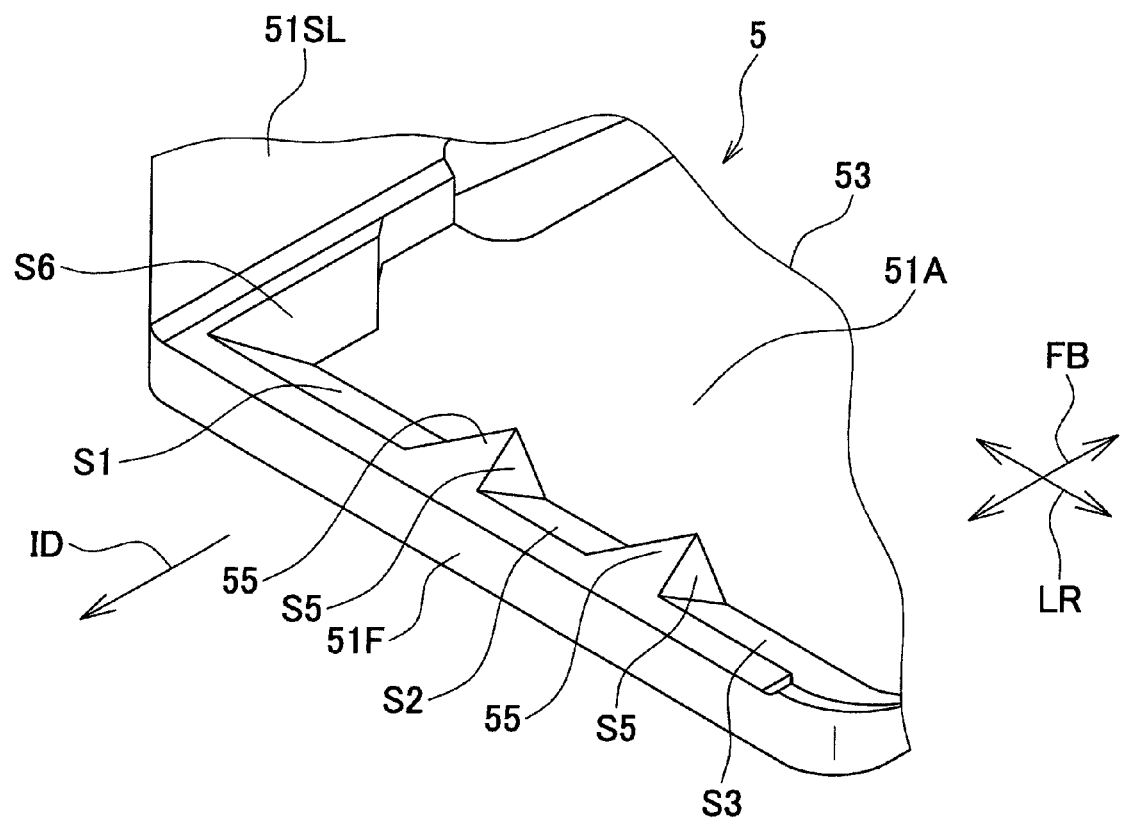
FIG. 11 is a perspective view of the front side portion of the card holder shown in FIG. 10.
Figure 16:
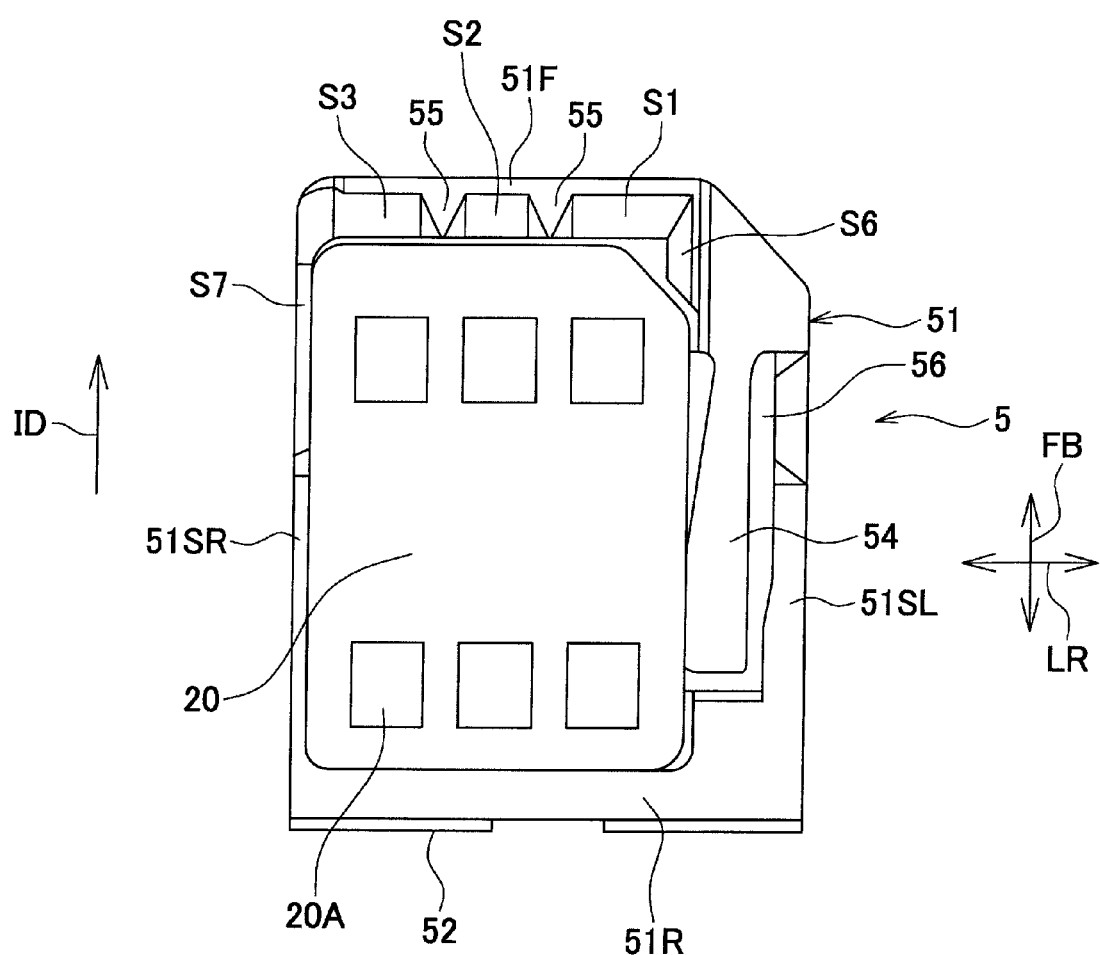
FIG. 16 is a view showing a state in which a card is correctly inserted into a card accommodating portion of the card holder.
Figure 17:
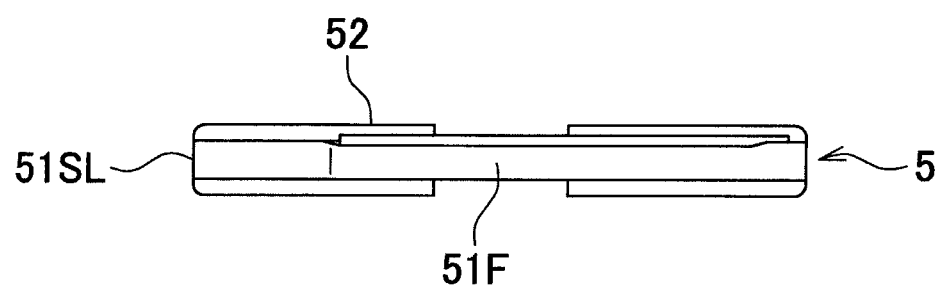
FIG. 17 is a view showing the state in which the card is correctly inserted into the card accommodating portion of the card holder, as viewed from the front.

To connect the card 20 to the connector 1 using the card holder 5, first, as shown in FIGS. 7 and 8, the card holder 5 is turned over (state shown in FIGS. 7 and 8), and the card 20 is accommodated in the card accommodating portion 51A. At this time, the free end of the spring portion 54 is moved in a direction away from the card accommodating portion 51A by pushing the same by the card 20 or the like, whereby the card 20 is accommodated in the card accommodating portion 51A (state shown in FIGS. 16 and 17). Then, the card 20 on the bottom portion 53 is urged against the inner peripheral surface of the side portion 51SR of the frame portion 51 by the returning force of the spring portion 54. As a result, the card 20 is held in the card accommodating portion 51A, and hence even when the card holder 5 is turned over (state shown in FIGS. 6 and 9), the card 20 is not removed from the card accommodating portion 51A.

Figure 1:
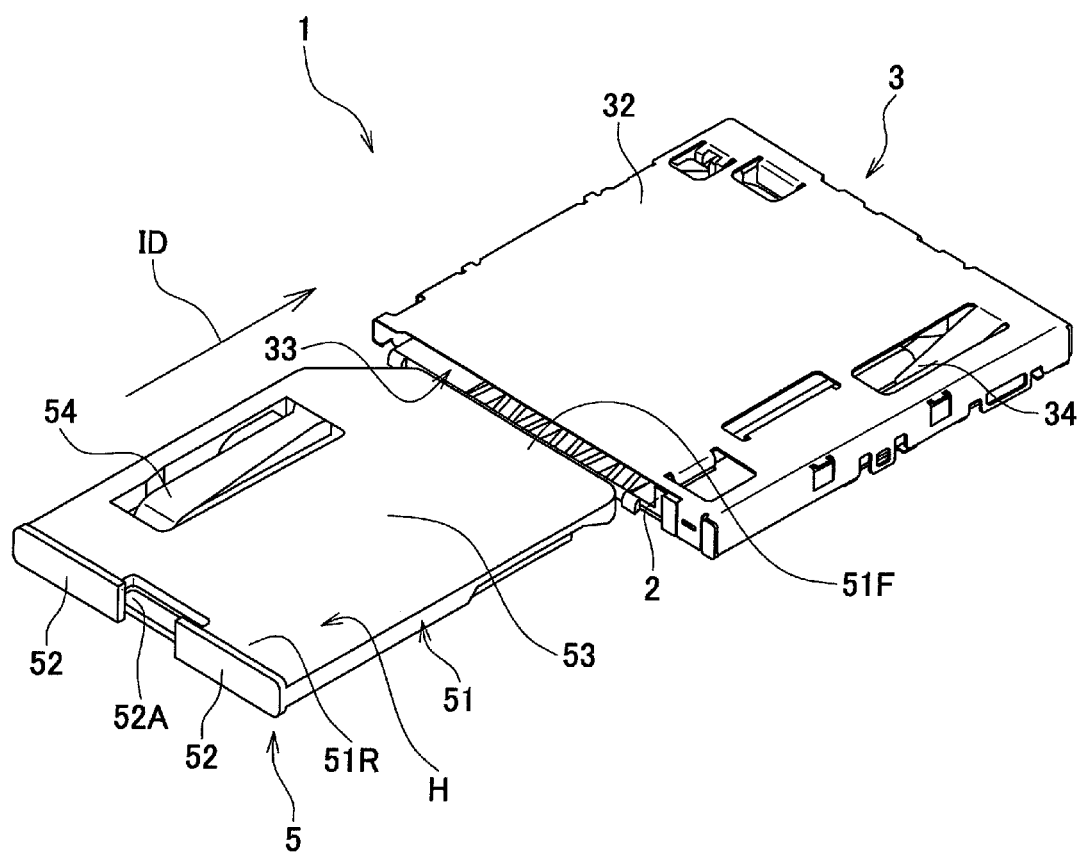
FIG. 1 is a perspective view of a connector according to a first embodiment of the present invention, as viewed obliquely from above, in a state before a card holder is inserted into a holder accommodating portion of a connector main body.
Figure 2:
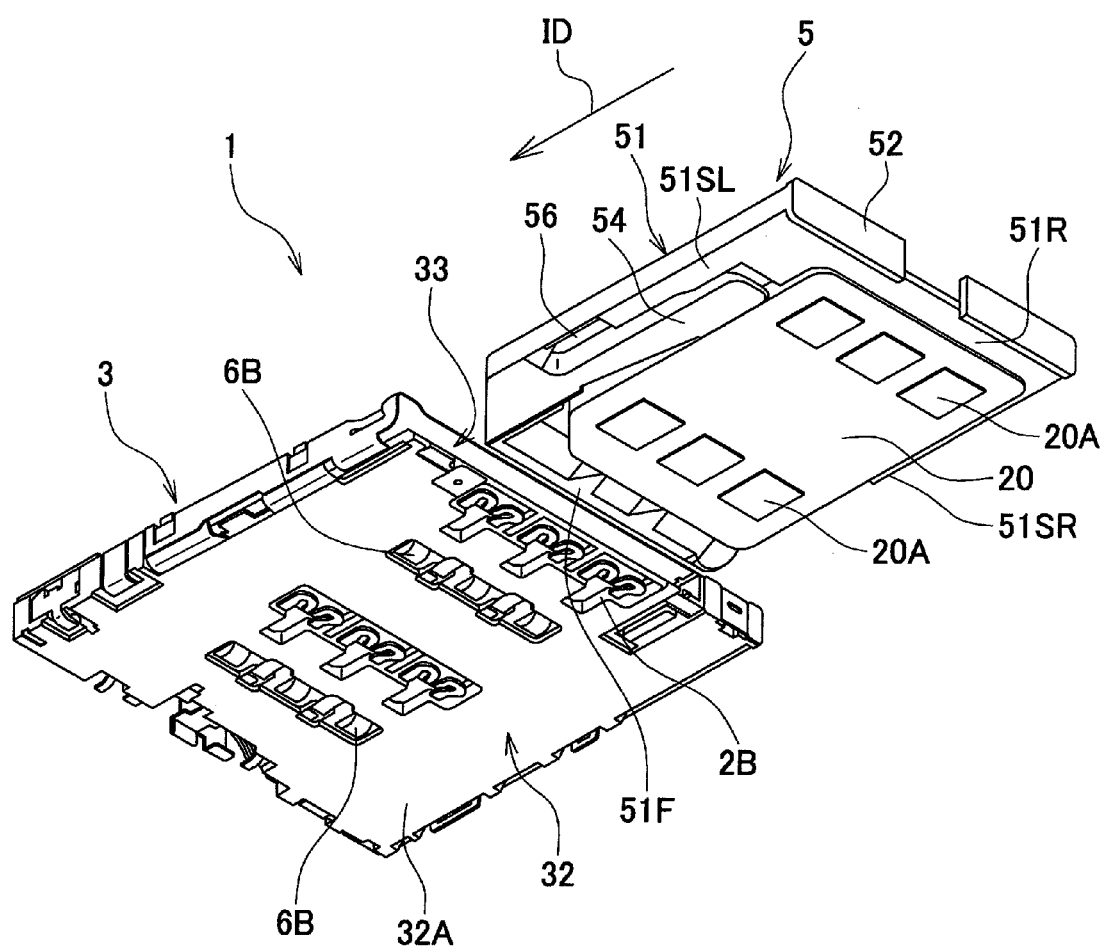
FIG. 2 is a perspective view of the connector shown in FIG. 1, as viewed obliquely from below, in the state before the card holder is inserted into the holder accommodating portion of the connector main body.
Figure 3:
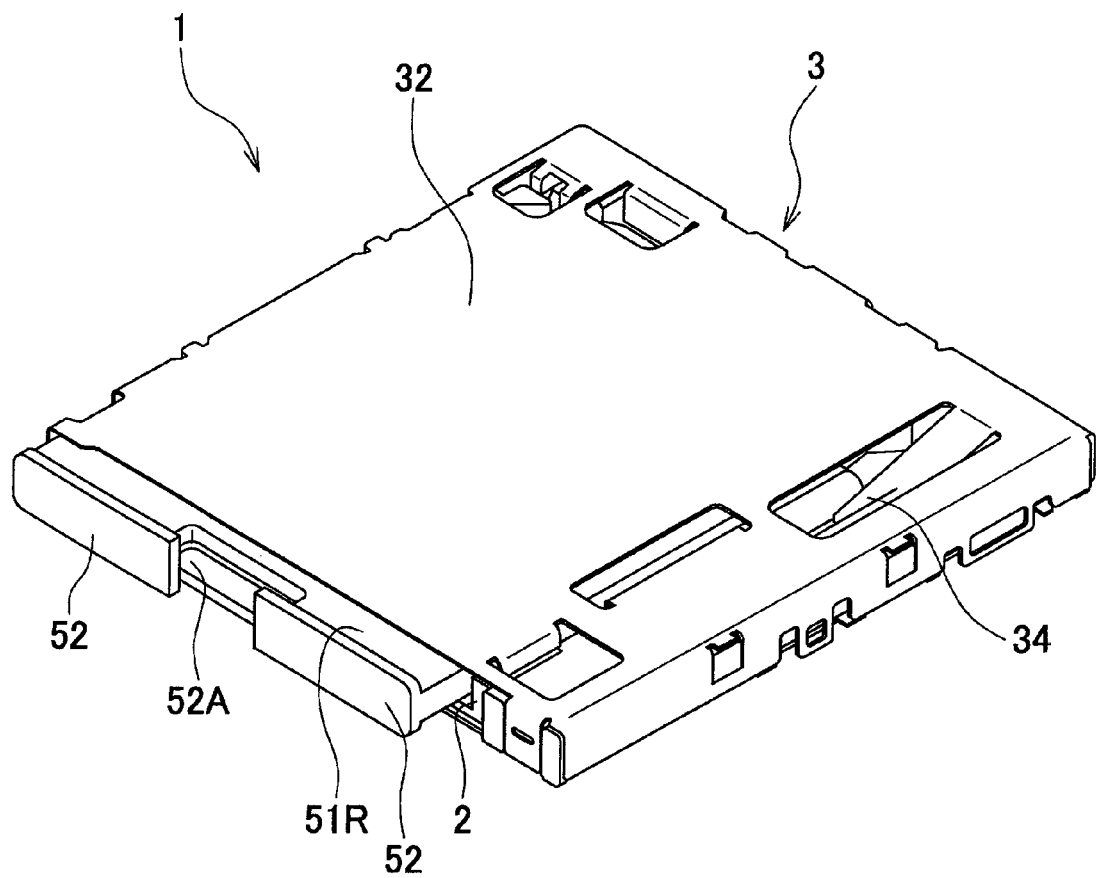
FIG. 3 is a perspective view of the connector shown in FIG. 1, as viewed obliquely from above, in a state after the card holder has been inserted into the holder accommodating portion of the connector main body.
Figure 4:
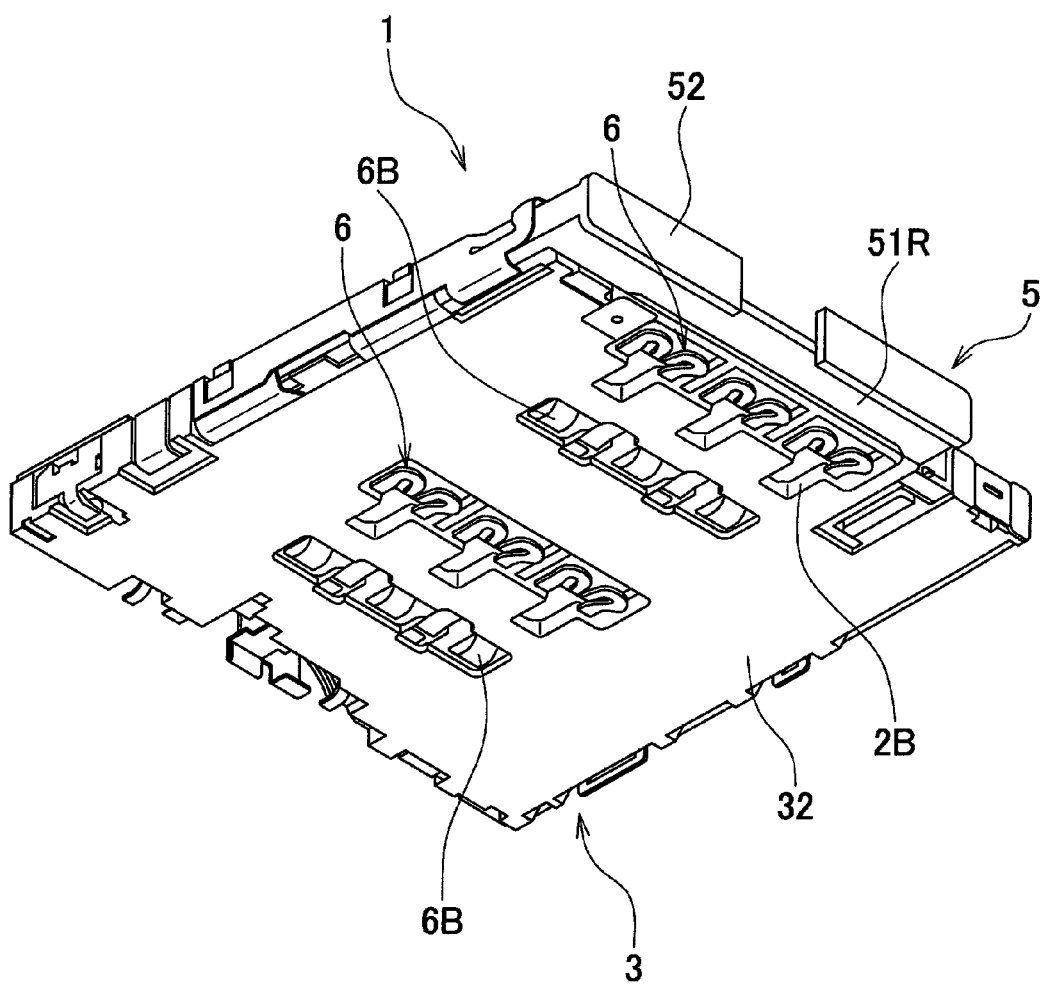
FIG. 4 is a perspective view of the connector shown in FIG. 1, as viewed obliquely from below, in the state after the card holder has been inserted into the holder accommodating portion of the connector main body.

Next, the front surface H of the card holder 5 is turned upward by pinching the operation portion 52 with fingers (state shown in FIGS. 6 and 9), and as shown in FIG. 1, the frame portion 51 of the card holder 5 is inserted into the holder accommodating portion 33 of the connector main body 3. When the frame portion 51 is inserted in the holder accommodating portion 33 (see FIG. 4), the contact portions 6A of the contacts 6 which protrude in the holder accommodating portion 33 are pushed and elastically deformed by the front portion 51F of the frame portion 51, and are pushed toward the escape holes 2B of the housing 2. The arrangement may be such that the contact portions 6A or the front portions of the contacts 6 are pushed into the escape holes 2B at this time. Alter, the front portions of the contacts 6 may be located in the escape holes 2B in their initial state.

When the frame portion 51 has been inserted into the holder accommodating portion 33 by more than a predetermined amount, the frame portion 51 is locked by a lock section (not shown) of the ejection mechanism 34, and is held in the holder accommodating portion 33, whereby insertion of the card holder 5 is completed. At this time, the contact portions 6A of the contacts 6 are urged against the electrode 20A of the card 20 by the returning force of the contact portions 6A of the contacts 6. As a result, the card 20 and the printed circuit board 22 are electrically connected to each other.

To eject the card holder 5 from the holder accommodating portion 33 of the connector main body 3, it is only necessary to push the operation portion 52 of the card holder 5 in the card inserting direction ID. When the operation portion 52 is pushed, an ejecting function of the ejection mechanism 34 operates, whereby most part of the card holder 5 is ejected from the connector main body 3, and hence only by pinching the operation portion 52 with fingers and drawing the card holder 5, the whole card holder 5 can be drawn out of the holder accommodating portion 33.

If the card holder 5 cannot be ejected due to some cause, by inserting the front end of the pin-shaped tool 10 inserted through an insertion slot 21A of the casing 21 into the recess 52A, hooking the same on the end portion of the operation portion 52, and then pulling the operation portion 52, it is possible to draw the card holder 5 out of the holder accommodating portion 33.

Further, in a case where the card holder 5 having no card 20 accommodated in the card accommodating portion 51A is ejected from the holder accommodating portion 33 of the connector main body 3, although the contact portions 6A of the contacts 6 are in the card accommodating portion 51A, when the card holder 5 moves in an ejecting direction (direction opposite from the card inserting direction ID), the contact portions 6A of the contacts 6 enter the inclined portions S1, S2, and S3 of the frame portion 51, and smoothly slide on respective slopes of the inclined portions S1, S2, and 83 to be pushed toward the escape holes 2B, which makes it possible to extract the card holder 5 from the holder accommodating portion 33 without damaging (plastically deforming) the contact portions 6A of the contacts 6.

Figure 13:
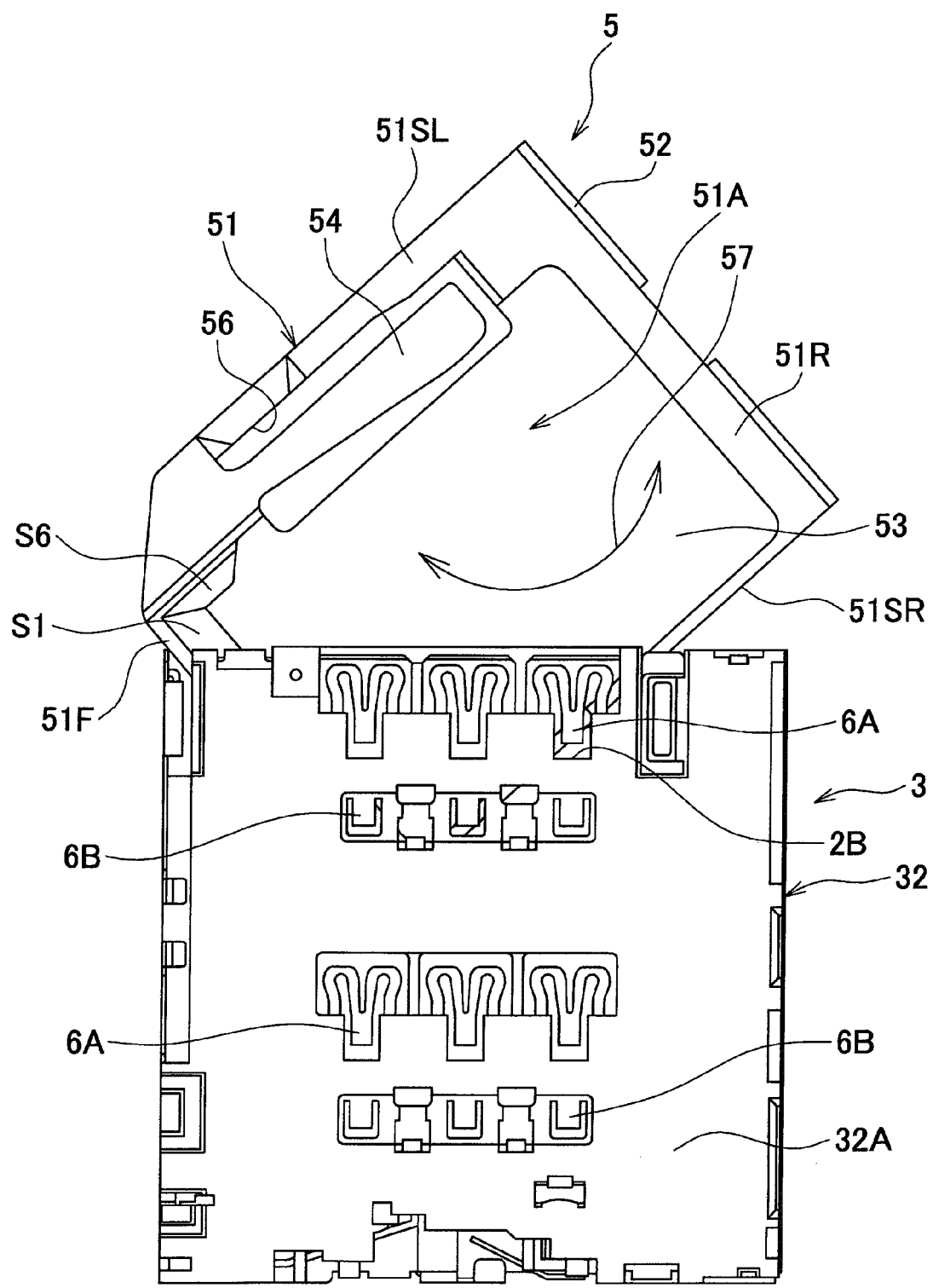
FIG. 13 is a view showing a state in which the card holder is being inserted into the holder accommodating portion of the connector main body shown in FIG. 1 while swinging the card holder from side to side.

Further, as shown in FIG. 13, in case the card holder 5 having no card 20 accommodated in the card accommodating portion 51A or the card holder 5 having the card 20 accommodated in the card accommodating portion 51A is inserted into the holder accommodating portion 33 of the connector main body 3 while swinging the card holder 5 from side to side (see reference numeral 57 in FIG. 13), the contact portions 6A of the contacts 6 enter the inclined portions S4, S5, S6, and S7 of the frame portion 51, and slide on respective slopes of the inclined portions 84, S5, S6, and S7 to be pushed toward the escape holes 2B, and hence the contact portions 6A are prevented from being deformed. As a result, it is possible to insert the card holder 5 into the holder accommodating portion 33 without damaging the contact portions 6A of the contacts 6.

According to the present embodiment, when the frame portion 51 of the card holder 5 is inserted into or extracted from the holder accommodating portion 33 of the connector main body 3, it is possible to reduce damage of the contact portions 6A of the contacts 6 caused by the frame portion 51.

Further, since the card 20 can be held in the card accommodating portion 51A using the returning force of the spring portion 54, even when the card holder 5 is turned over, the card 20 is prevented from dropping from the card accommodating portion 51A.

Further, when the contact force between the card holder 5 in the holder accommodating portion 33 and the connector main body 3 is larger than a holder ejecting force of the ejection mechanism 34 due to some cause, whereby the card holder 5 cannot be ejected from the holder accommodating portion 33, by inserting the front end of the pin-shaped tool 10 inserted through the insertion slot 21A of the casing 21 in the recess 52A, hooking the same on the end portion of the operation portion 52, and then pulling the operation portion 52, it is possible to draw the card holder 5 out of the holder accommodating portion 33.

Next, a description will be given of a variation of the connector 1 according to the first embodiment of the present invention with reference to FIGS. 18 to 23.

The same components as those of the connector according to the first embodiment are denoted by the same reference numerals, and detailed description thereof is omitted, while only main components different from those of the first embodiment will be described hereafter.

Figure 18:
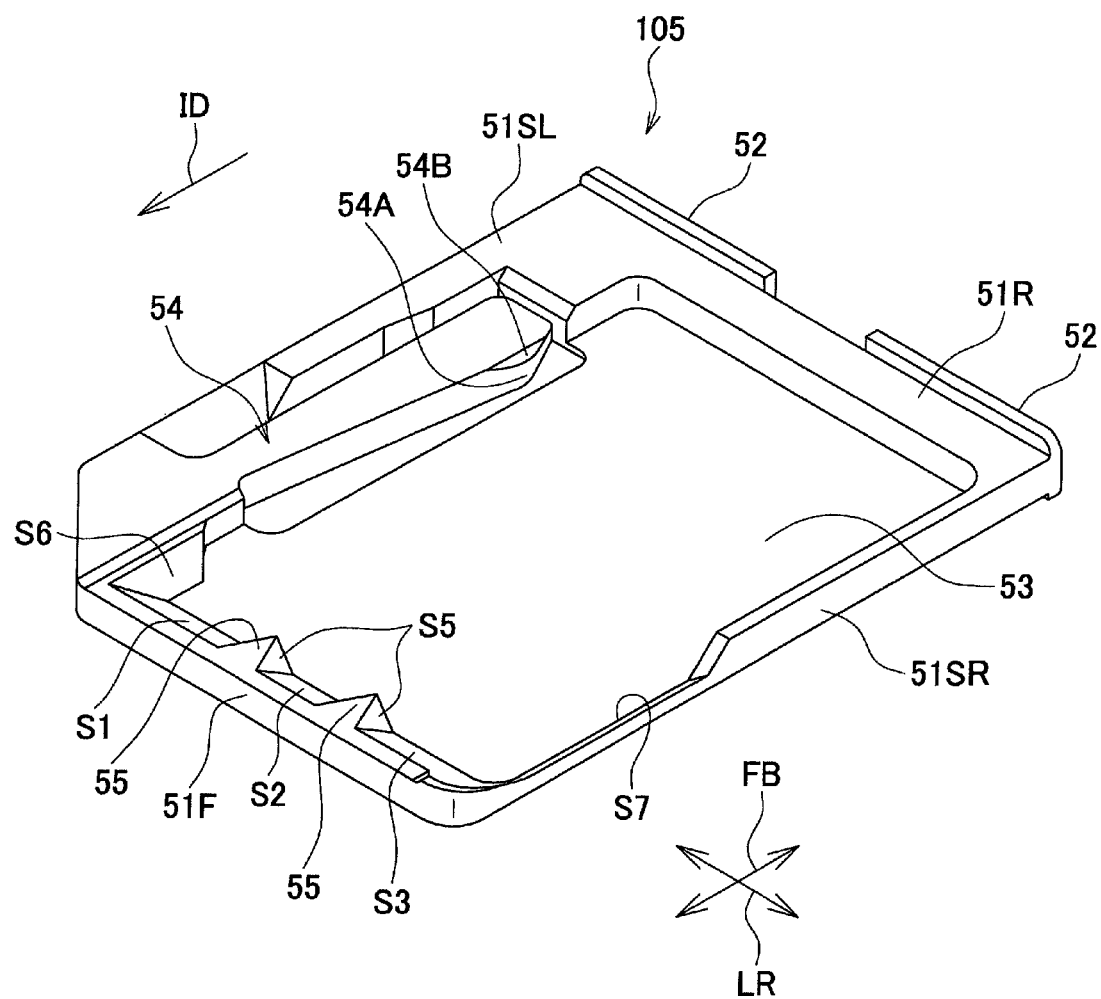
FIG. 18 is a perspective view of a reverse surface of a card holder as a variation of the card holder of the connector shown in FIG. 1.
Figure 19:
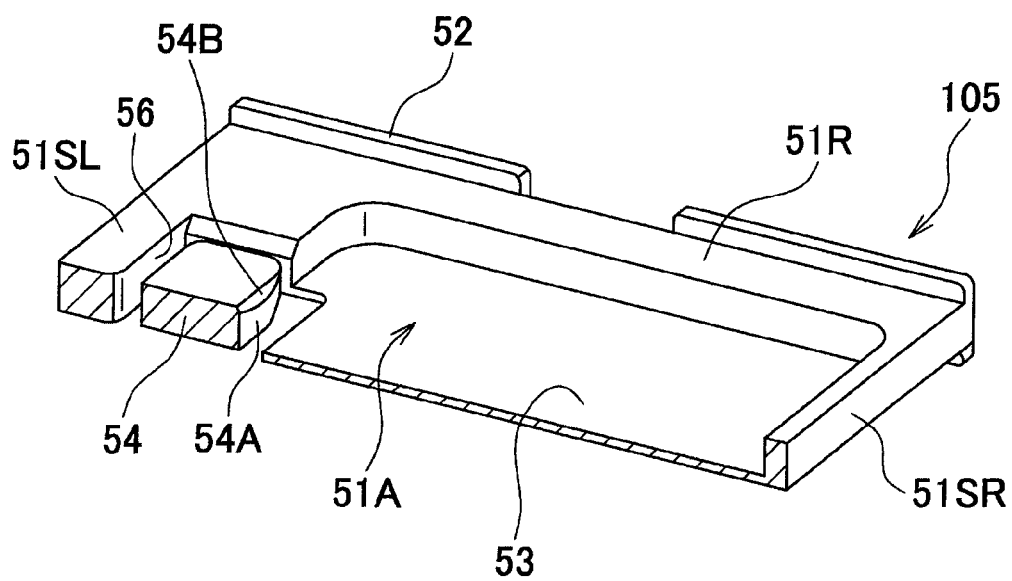
FIG. 19 is a cross-sectional perspective view of a rear-side portion of the card holder shown in FIG. 18.
Figure 20:
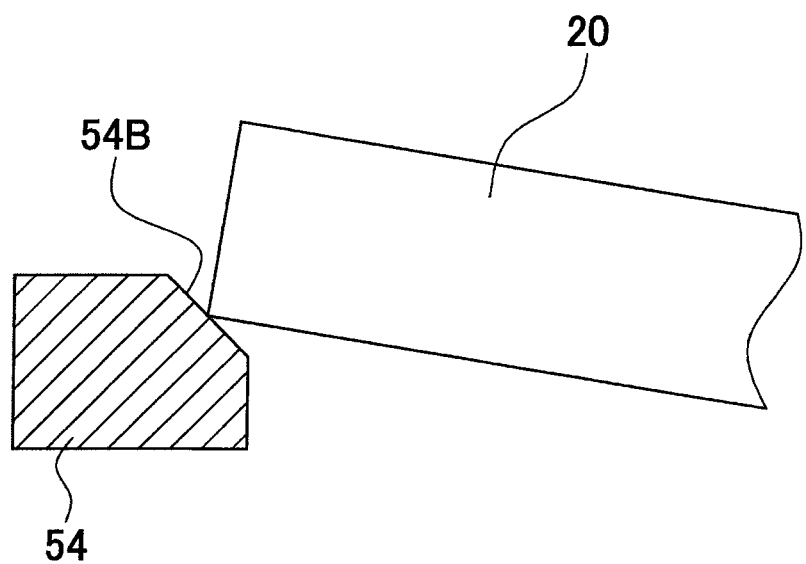
FIG. 20 is a conceptual view of a state in which an edge portion of the card is brought into contact with a spring portion-side inclined portion of the card holder shown in FIG. 18.

A card holder 105 of the variation, as shown in FIGS. 18 and 19, is formed with a spring portion-side inclined portion 54B at a location close to the free end of the spring portion 54.

The spring portion-side inclined portion 54B is located adjacent to a contact portion 54A which is located at a free end side of the spring portion 54, and is brought into contact with an outer peripheral surface of the card 20.

The spring portion-side inclined portion 54B has a function for guiding the card 20 out of the card accommodating portion 51A when the card 20 is obliquely accommodated in the card accommodating portion 51A (i.e. when the card 20 is not accommodated to a proper position within the card accommodating portion 51A), and a function for converting a force of the card 20 that pushes the spring portion 54 downward when the card 20 is accommodated into the card accommodating portion 51A to a force that pushes the contact portion 54A of the spring portion 54 in a direction away from the card accommodating portion 51A to thereby elastically deform the spring portion 54.

Figure 22:
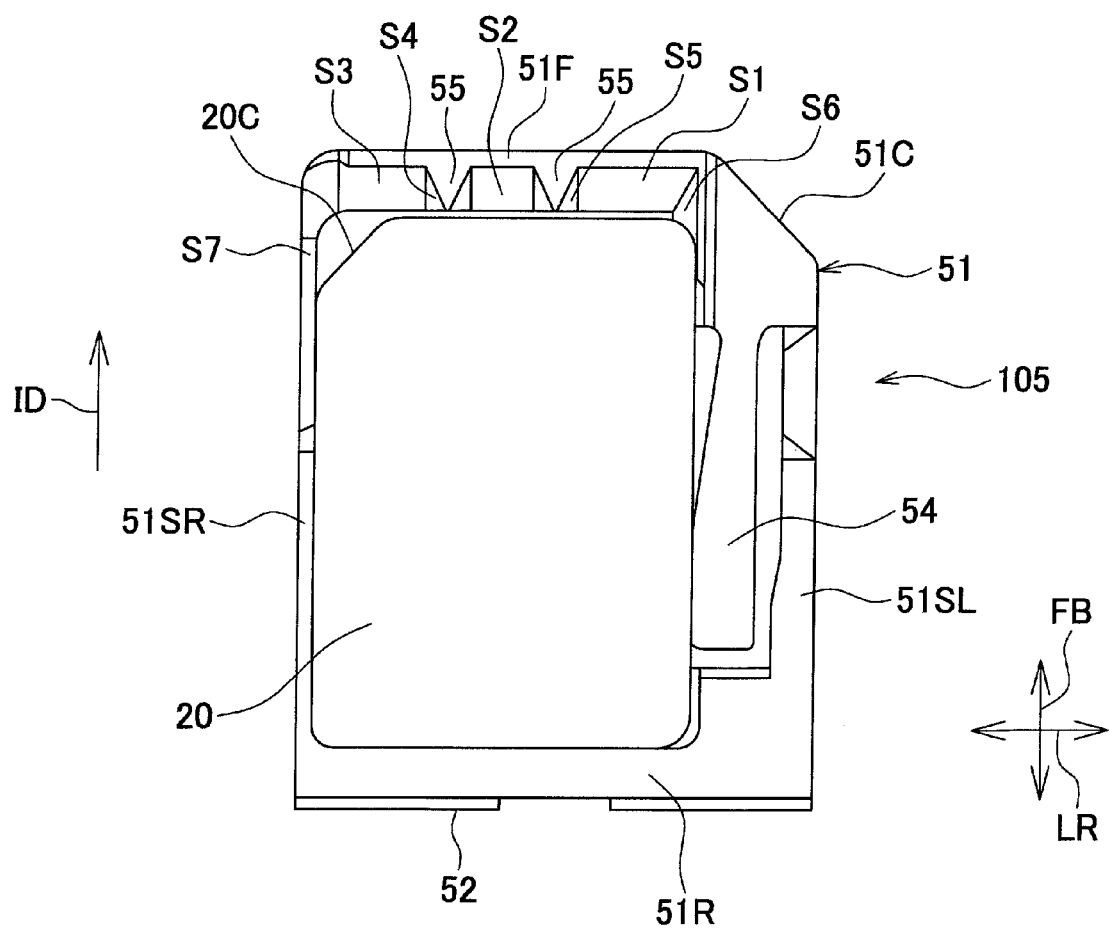
FIG. 22 is a view showing a state in which the card is obliquely accommodated in the card accommodating portion of the card holder shown in FIG. 18.
Figure 23:
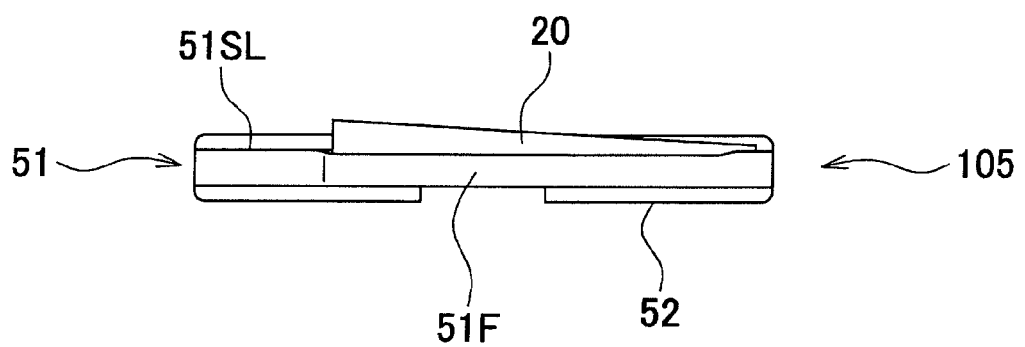
FIG. 23 is a view showing the state in which the card is obliquely accommodated in the card accommodating portion of the card holder shown in FIG. 18, as viewed from the front.

In the connector 1 of the first embodiment and the card holder 105 of the above-described variation, as shown in FIGS. 22, and 23, if the card 20 is accommodated in the card accommodating portion 51A without setting a positioning portion 20C of the card 20 on a side of a card positioning portion 51C of the frame portion 51, i.e. if the card 20 is erroneously accommodated in the card accommodating portion 51A in a turned over position (causing the electrode 20A of the card 20 to face toward the bottom side) or upside down, the card 20 is sometimes obliquely positioned in the card accommodating portion 51A. Alternatively, also in a case where although the card 20 has been accommodated in the card accommodating portion 51A by properly positioning the card 20 (setting the positioning portion 20C on the same side as the card positioning portion 51C) when accommodating the card 20, the card 20 has been incompletely accommodated without completely pushing the card 20 into the card accommodating portion 51A, the card 20 is sometimes obliquely positioned in the card accommodating portion 51A. At this time, one end of the card 20 in the left-right direction LR is lifted up, but it is difficult to visually determine whether or not the card 20 is lifted up.

Figure 21:
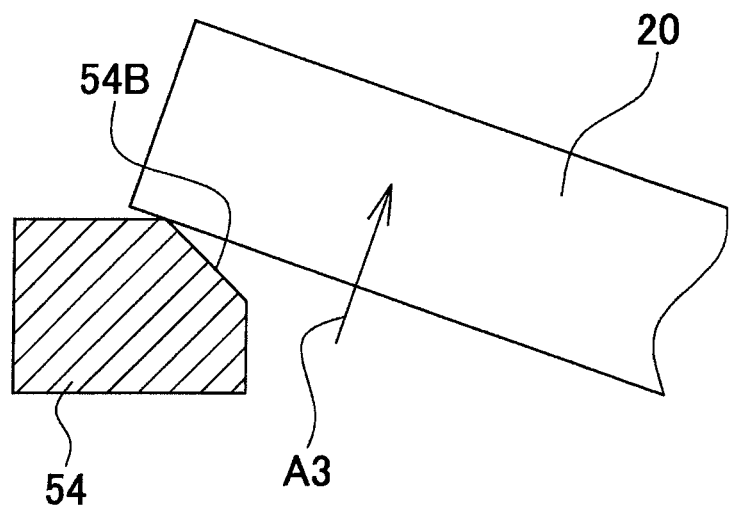
FIG. 21 is a conceptual view showing a state in which the edge portion of the card is pushed upward by the spring portion-side inclined portion of the card holder shown in FIG. 18.

In the card holder 105 of this variation, when the card 20 is obliquely accommodated in the card accommodating portion 51A, i.e. when the card 20 is not properly accommodated (see FIGS. 16 and 17), an edge of one end of the card 20 is located at the spring portion-side inclined portion 54B (see FIG. 20), and hence the returning force of the spring portion 54 acts on the card 20, whereby the card 20 is guided out of the card accommodating portion 51A (in a direction indicated by an arrow A3 in FIG. 21) (see FIG. 21). As a result, the one end of the card 20 is apparently lifted up, which makes it easy for a user to visually determine whether or not the card 20 is correctly accommodated in the card accommodating portion 51A. Further, in this variation, when the card 20 is accommodated in the card accommodating portion 51A by setting the positioning portion 20C of the card 20 on the same side as the card positioning portion 51C of the frame portion 51, i.e. by performing proper positioning, only by pushing the card 20 toward the bottom portion, the spring portion 54 is elastically deformed by action of the spring portion-side inclined portion 54B, whereby it is possible to correctly accommodate the card 20 in the card accommodating portion 51A.

Next, a description will be given of a connector according to a second embodiment of the present invention with reference to FIGS. 24 and 26.

The same components as those of the connector according to the first embodiment are denoted by the same reference numerals, and detailed description thereof is omitted, while only main components different from those of the first embodiment will be described hereafter. Further, the connector main body is the same as that of the first embodiment, and hence description thereof is omitted.

Figure 24:
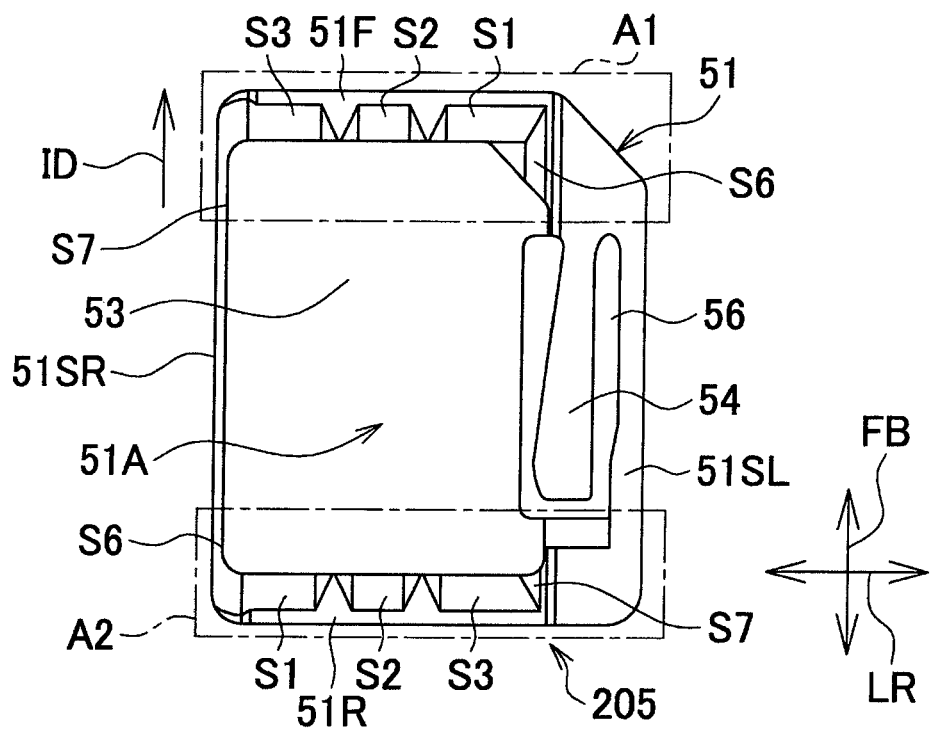
FIG. 24 is a view of a reverse surface of a card holder of a connector according to a second embodiment of the present invention.
Figure 25:
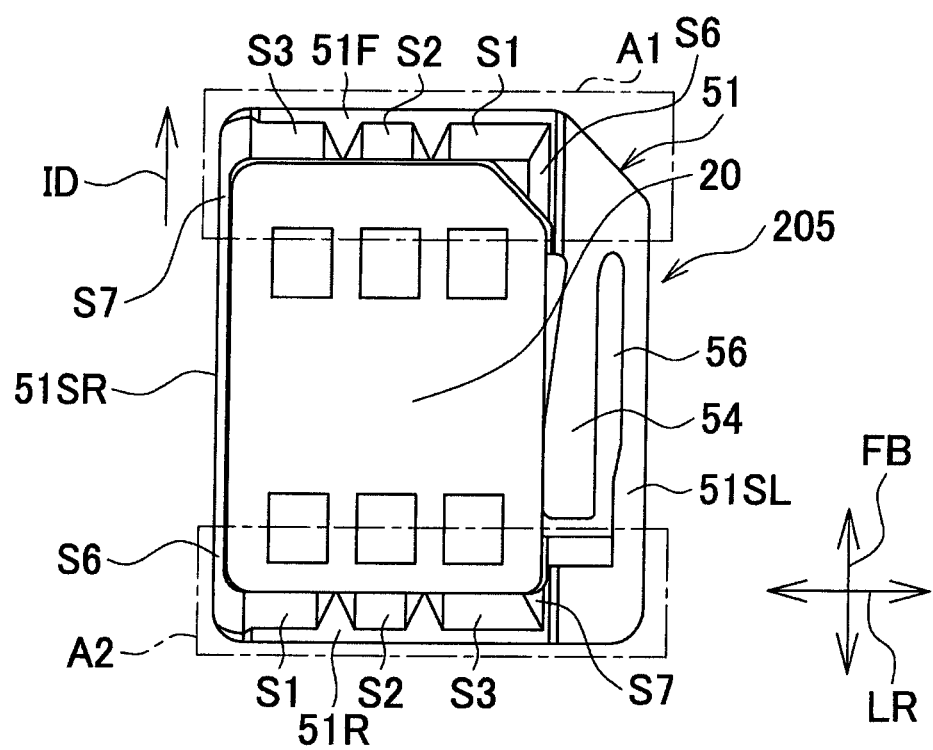
FIG. 25 is a view showing a state in which a card is accommodated in a card accommodating portion of the card holder shown in FIG. 24.

Although in the card holder 5 of the first embodiment, the inclined portions S1 to S7 are formed only on the front side of the frame portion 51, in a card holder 205 of the second embodiment, as shown in FIG. 24, the inclined portions S1 to S7 are also formed on the rear side of the frame portion 51.

Further, the operation portion 52 is not provided on the rear portion 51R of the frame portion 51.

Figure 26:
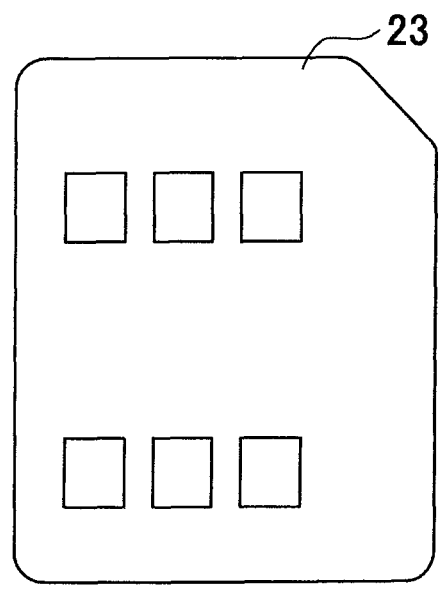
FIG. 26 is a plan view of a card of a different type from the card accommodated in the card accommodating portion of the card holder shown in FIG. 24.

A card 23 shown in FIG. 26 is the same outer shape in plan as that of the card 20 accommodated in the card accommodating portion 51A of the card holder 205, but is larger in size than the card 20. The card holder 205 has substantially the same outer shape in plan and size as those of the card 23, and is slightly larger in thickness than the card 23.

It is possible to directly insert the card 23 into the holder accommodating portion 33 of the connector main body 3, and it is also possible to insert the card 20 which is different in type from the card 23 using the card holder 205.

Note that in the present embodiment, an area A2 (see FIG. 24) in which the rear portion 51R, the rear side of the side portion 51SR, and the rear side of the side portion 51SL of the frame portion 51 are located corresponds to the rear side of the frame portion 51.

According to the second embodiment, even when the card holder 205 is erroneously inserted in a reversed direction, it is possible to reduce damage of the contact portions 6A of the contacts 6 similarly to a case where the card holder 205 is correctly inserted (a case where the card holder 205 is inserted from the front side of the card holder 205).

Next, a description will be given of a connector according to a third embodiment of the present invention with reference to FIGS. 27 to 32.

The same components as those of the connector according to the first embodiment are denoted by the same reference numerals, and detailed description thereof is omitted, while only main components different from those of the first embodiment will be described hereafter. Further, the connector main body is the same as that of the first embodiment, and hence description thereof is omitted.

Figure 27:
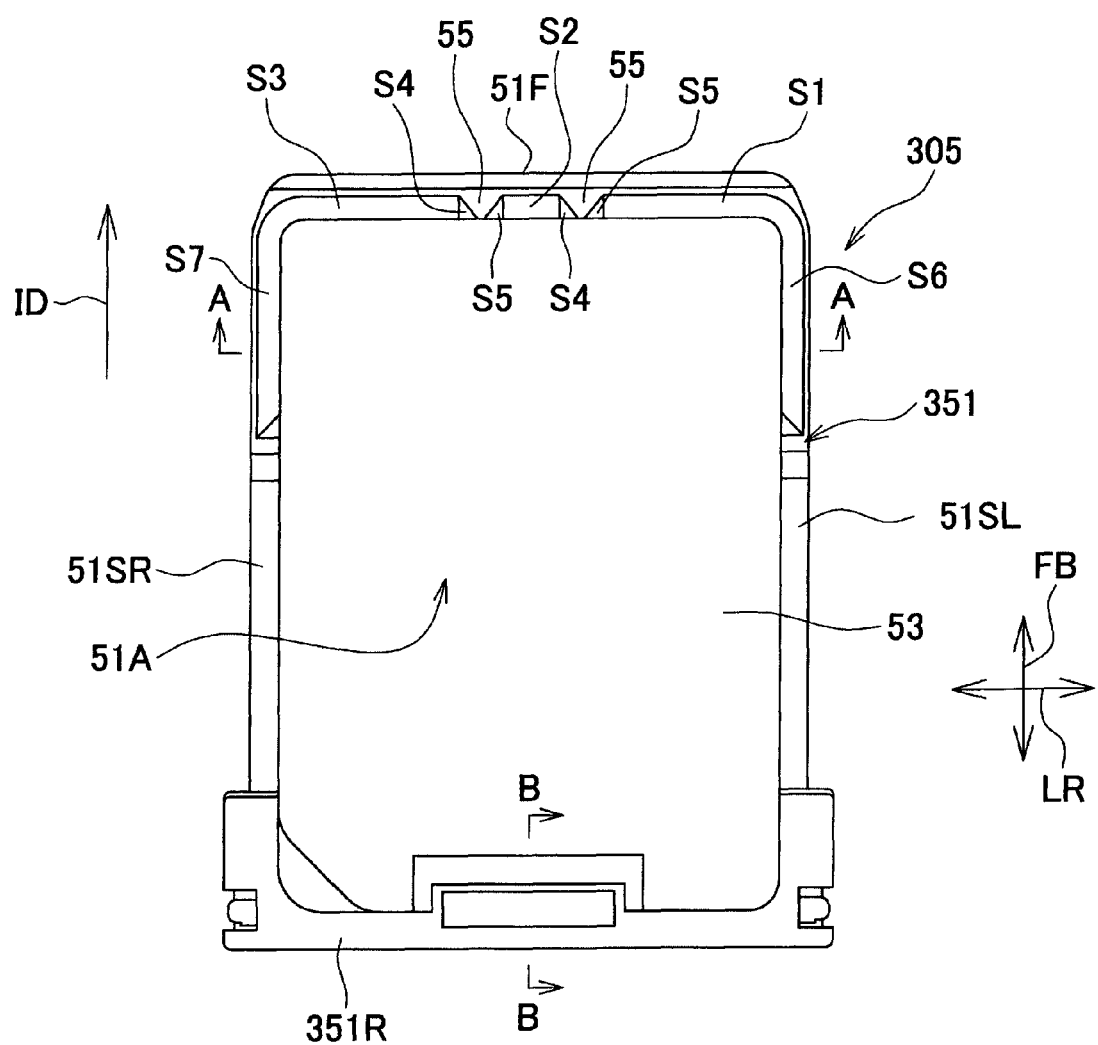
FIG. 27 is a view of a reverse surface of a card holder of a connector according to a third embodiment of the present invention.
Figure 28:
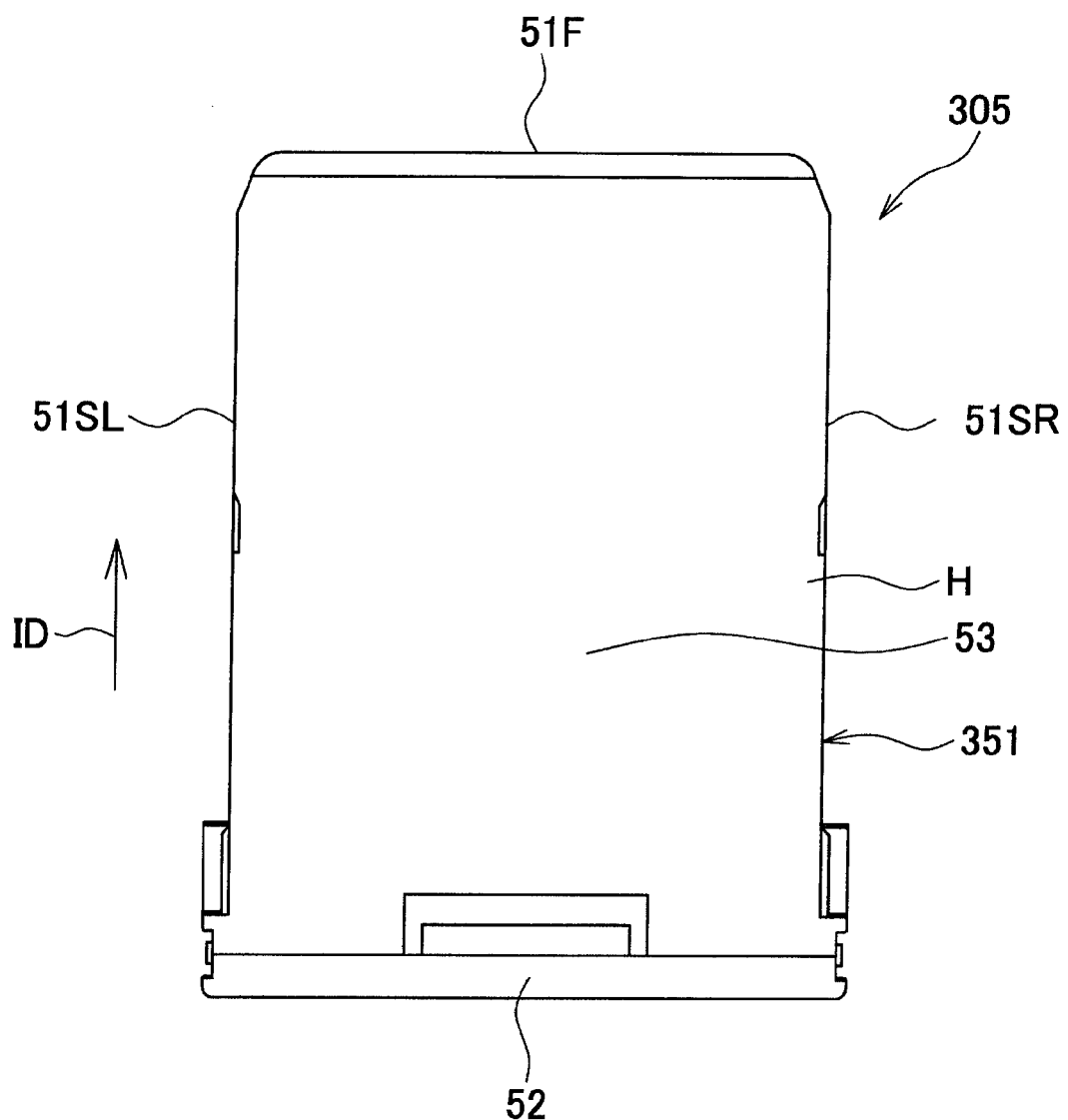
FIG. 28 is a view of a front surface of the card holder shown in FIG. 27.
Figure 29:
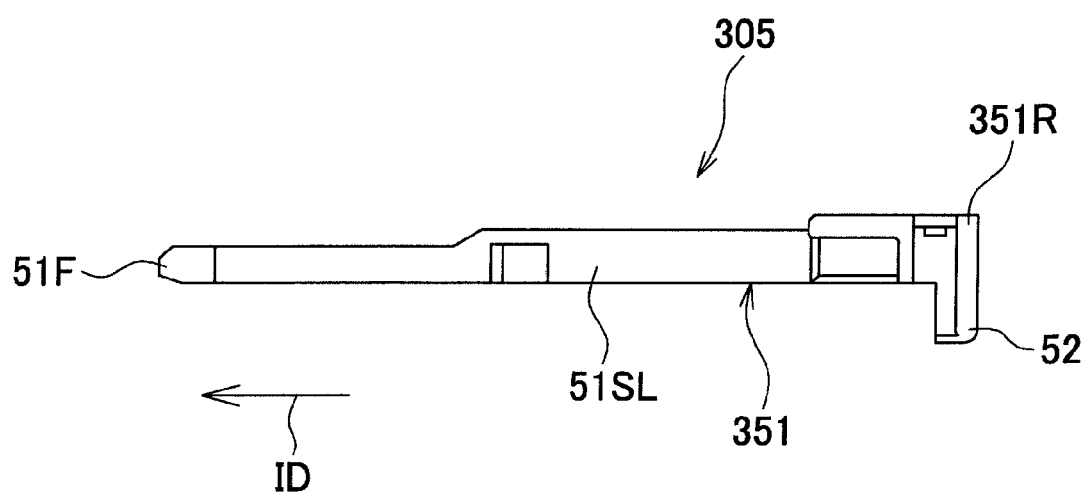
FIG. 29 is a side view of the card holder shown in FIG. 27.

As shown in FIGS. 27 to 29, the spring portion 54 of the card holder 5 (see FIG. 8) of the first embodiment is not employed for a card holder 305 of the third embodiment. In the card holder 305, the card 20 accommodated in the card accommodating portion 51A is supported by a protruding portion 3511 (see FIGS. 31 and 32) provided on a rear portion 351R of a frame portion 351 in a manner protruding in the card inserting direction ID and the bottom portion 53 which is opposed to the protruding portion 3511 in a holder thickness direction UD (see FIG. 31).

Figure 30:
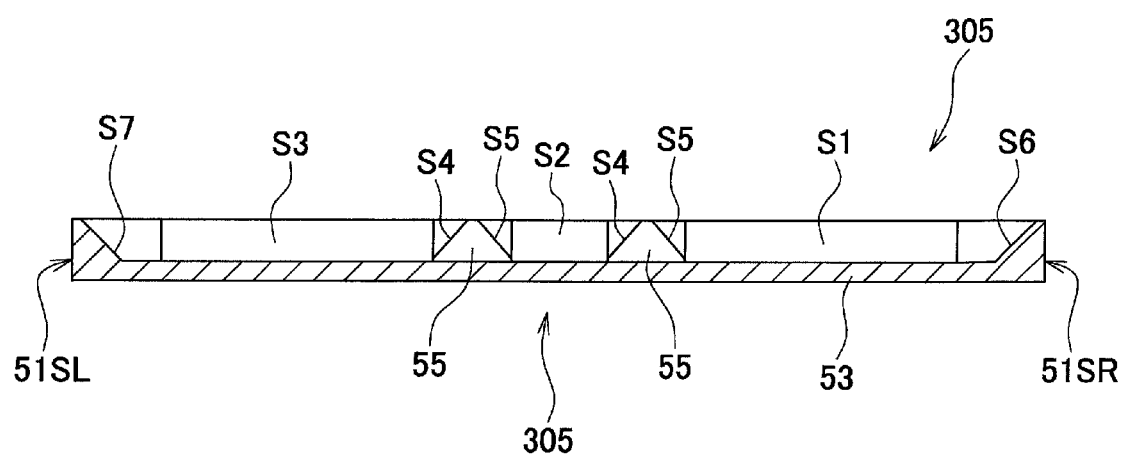
FIG. 30 is a cross-sectional view taken along A-A in FIG. 27.
Figure 31:
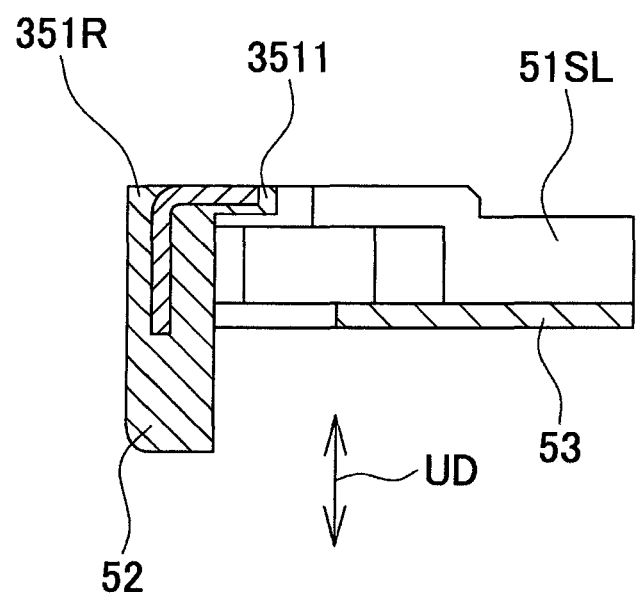
FIG. 31 is a cross-sectional view taken along B-B in FIG. 27.
Figure 32:
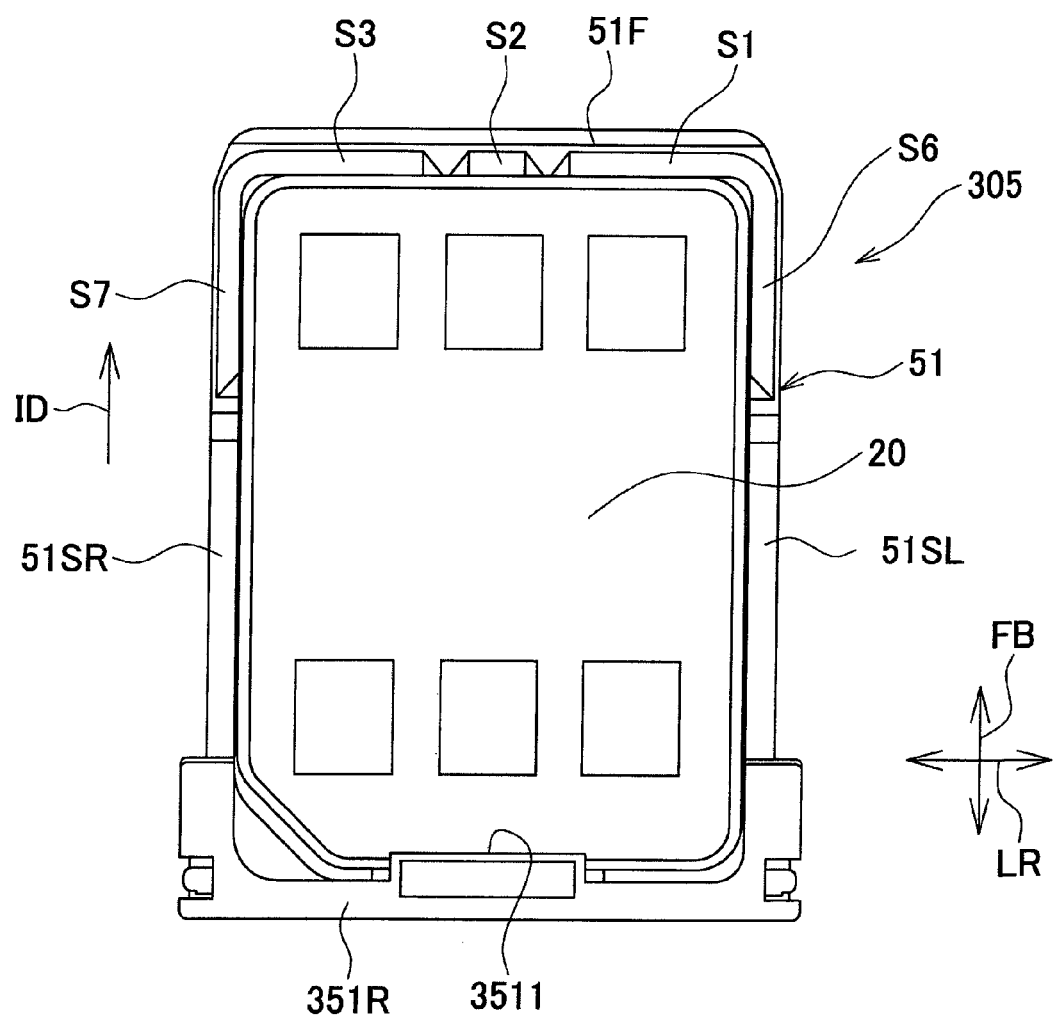
FIG. 32 is a view showing a state in which a card is accommodated in a card accommodating portion of the card holder shown in FIG. 27.
Figure 33:
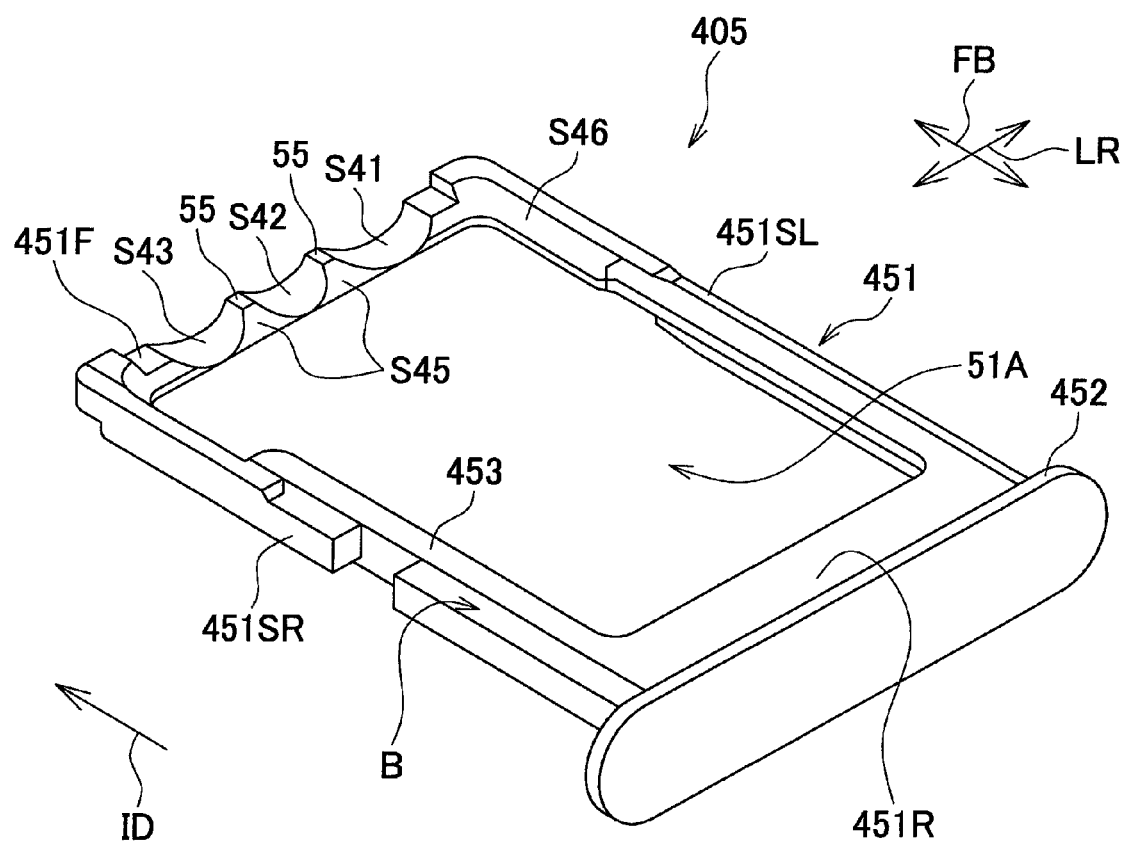
FIG. 33 is a perspective view of a reverse surface of a card holder of a connector according to a fourth embodiment of the present invention.

Further, in the card holder 305 of the third embodiment, as shown in FIGS. 27, 30, and 32, the inclined portions S1 to S7 are formed only on the front side of the frame portion 51.

According to the third embodiment, it is possible to obtain the same advantageous effects as provided by the first embodiment.

Next, a description will be given of a connector according to a fourth embodiment of the present invention with reference to FIGS. 33 to 41.

The same components as those of the connector according to the first embodiment are denoted by the same reference numerals, and detailed description thereof is omitted, while only main components different from those of the first embodiment will be described hereafter. Further, the connector main body is the same as that of the first embodiment, and hence description thereof is omitted.

Figure 39:
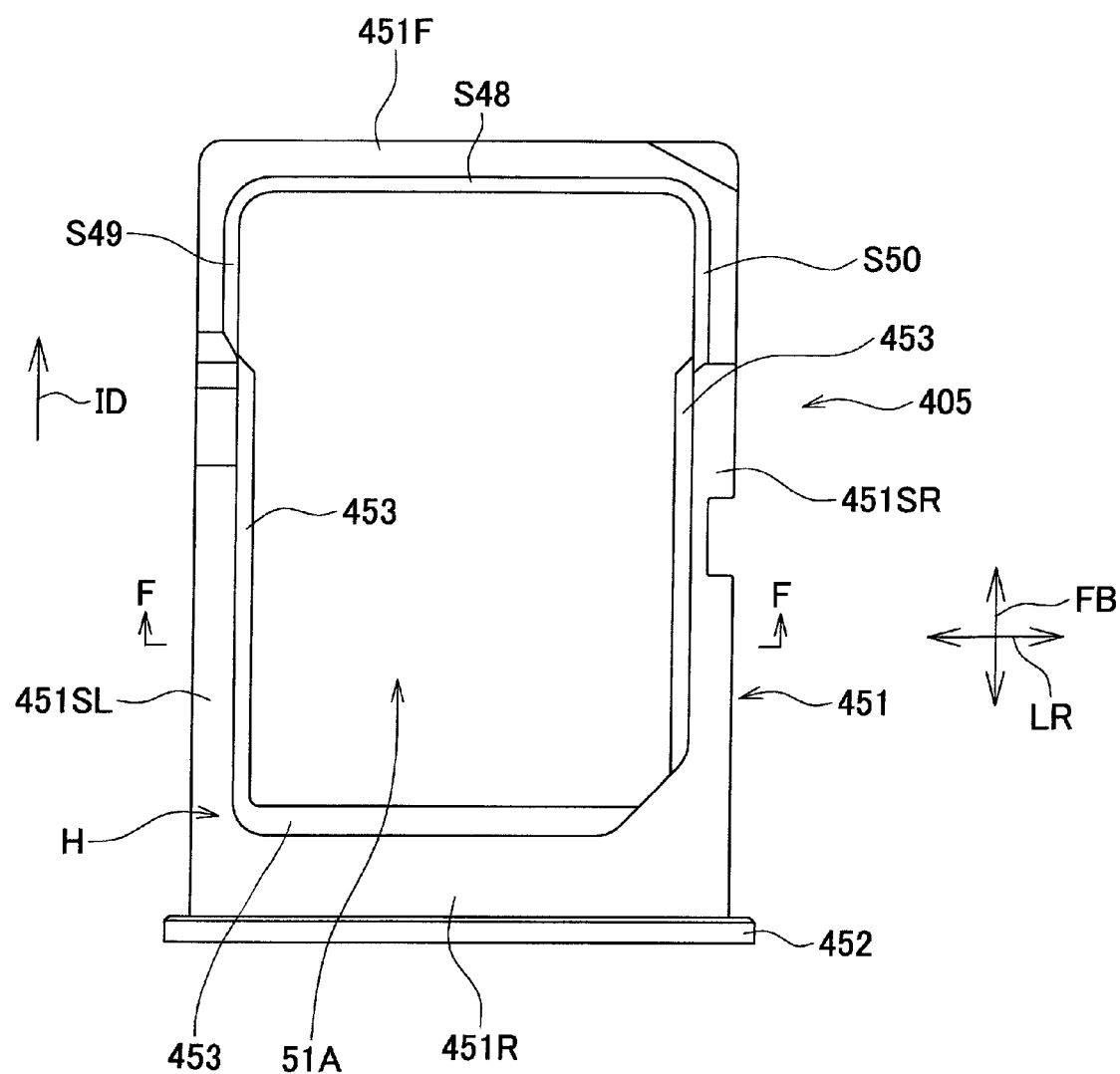
FIG. 39 is a view of the front surface of the card holder shown in FIG. 33.
Figure 40:
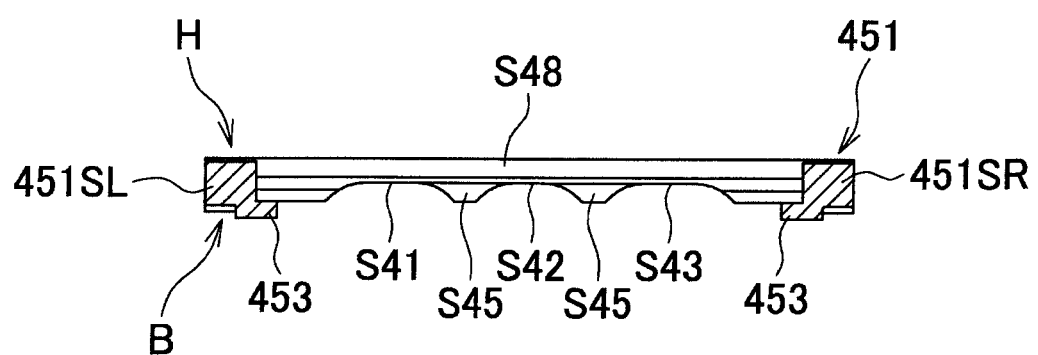
FIG. 40 is a cross-sectional view taken along F-F in FIG. 39.

As shown in FIGS. 33 to 37, the bottom portion 53 is not employed for a card holder 405 of the fourth embodiment. Therefore, the card holder 405 of the fourth embodiment is not a tray card holder as described in the above embodiments. As shown in FIG. 39, the card holder 405 is provided with supporting portions 453 on a frame portion 451, for supporting the peripheral portion of the card 20. The supporting portions 453 are protruding pieces which protrude from a side portion 451SL, a rear portion 451R, and a side portion 451SR of the frame portion 451 into the card accommodating portion 51A, respectively. The supporting portions 453 are continuous with each other, extending along from the side portion 451SR via the rear portion 451R to the side portion 451SL of the frame portion 451. Note that the rear portion 451R of the frame portion 451 is provided with an operation portion 452.

Figure 41:
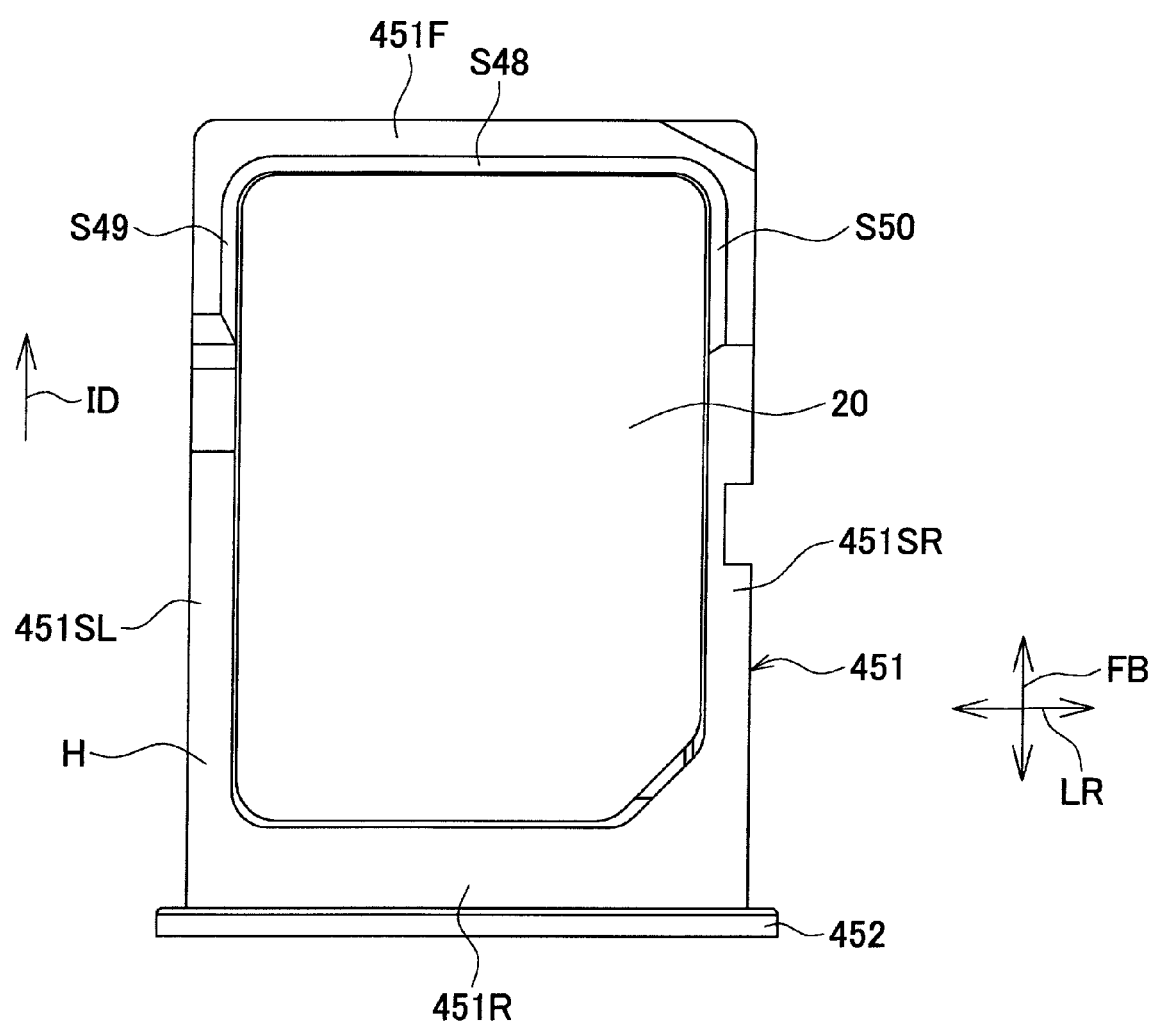
FIG. 41 is a view showing a state in which a card is accommodated in the card holder shown in FIG. 33.
Figure 42:
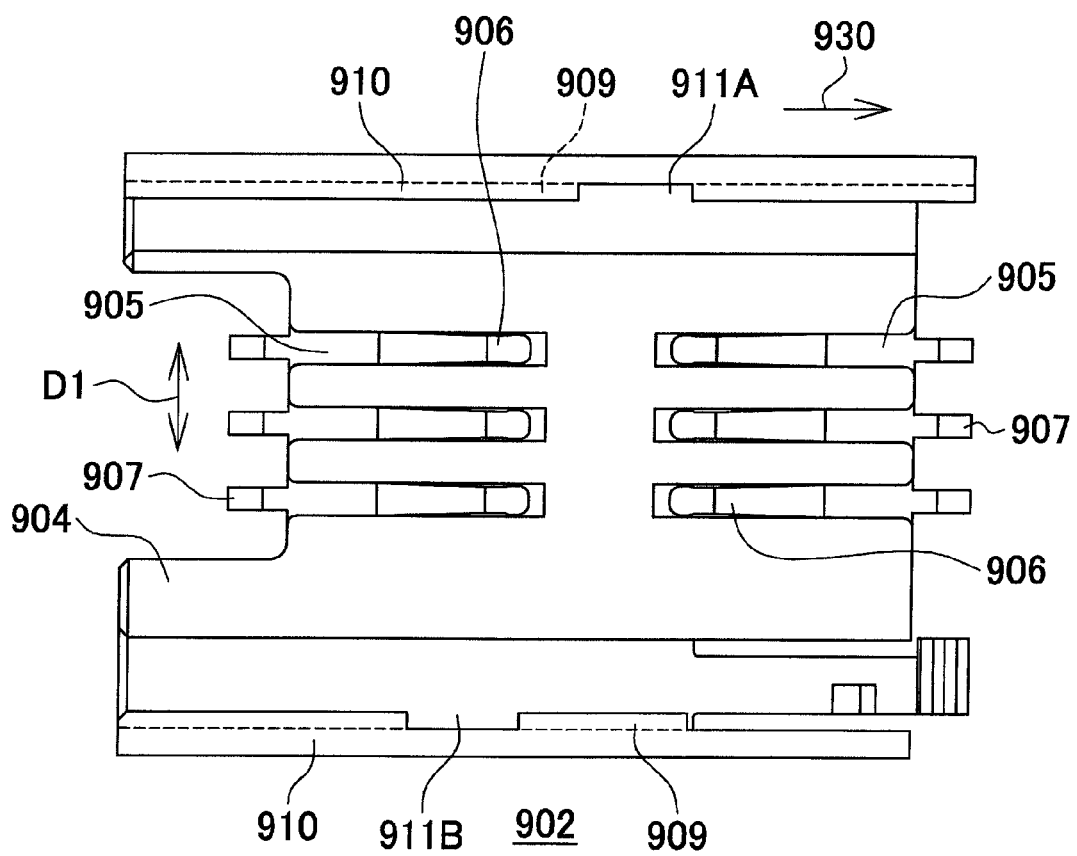
FIG. 42 is a plan view of a housing main body of a conventional connector for a card.
Figure 43:
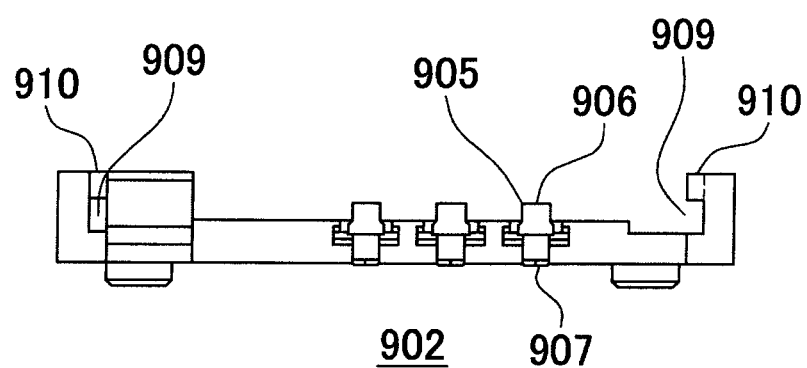
FIG. 43 is a right side view of the housing main body shown in FIG. 42.
Figure 44:
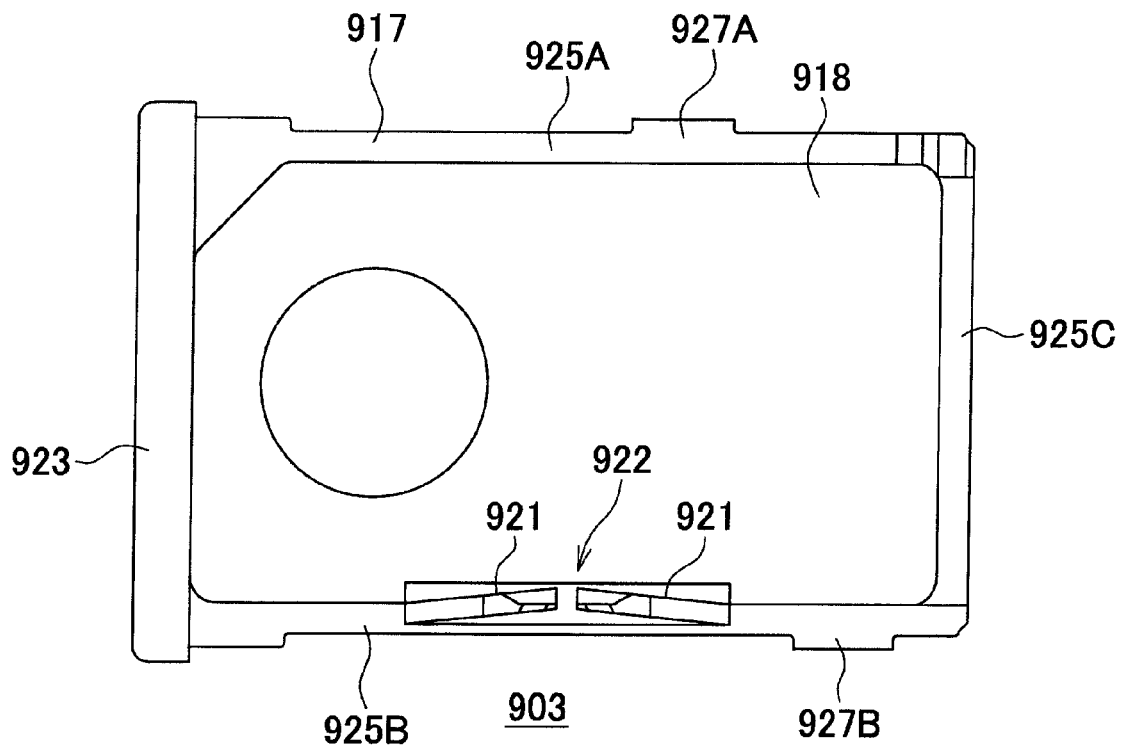
FIG. 44 is a view of a card holder of the conventional connector for a card.

As can be understood from FIG. 39 and FIG. 41, the supporting portions 453 support the peripheral portion of the card 20.

Further, the front surface H and the reverse surface B of the frame portion 451 are both provided with deformation suppressing portions.

First, the deformation suppressing portions on the reverse surface B of the frame portion 451 will be described. A front portion 451F of the frame portion 451 is formed with grooves (deformation suppressing portion) S41, S42, and S43. The grooves 841, S42, and 543 are grooves substantially semi-circular in cross-section which extend in the front-rear direction FB (see FIGS. 33, 37, and 40). The card receiving portions 55 which receive the peripheral portion of the card 20 accommodated in the card accommodating portion 51A are formed between the grooves S41 and S42, and between the grooves S42 and S43, respectively. Each card receiving portion 55 is formed with an inclined portion (deformation suppressing portion) S45. The inclined portion S45 is inclined in the front-rear direction FB. The grooves S41, S42, and S43 each function in the same manner as the inclined portions S1, S2, S3, S4, and 85 of the first embodiment. The inclined portion S45 functions in the same manner as the inclined portions S4 and S5 of the first embodiment.

Figure 34:
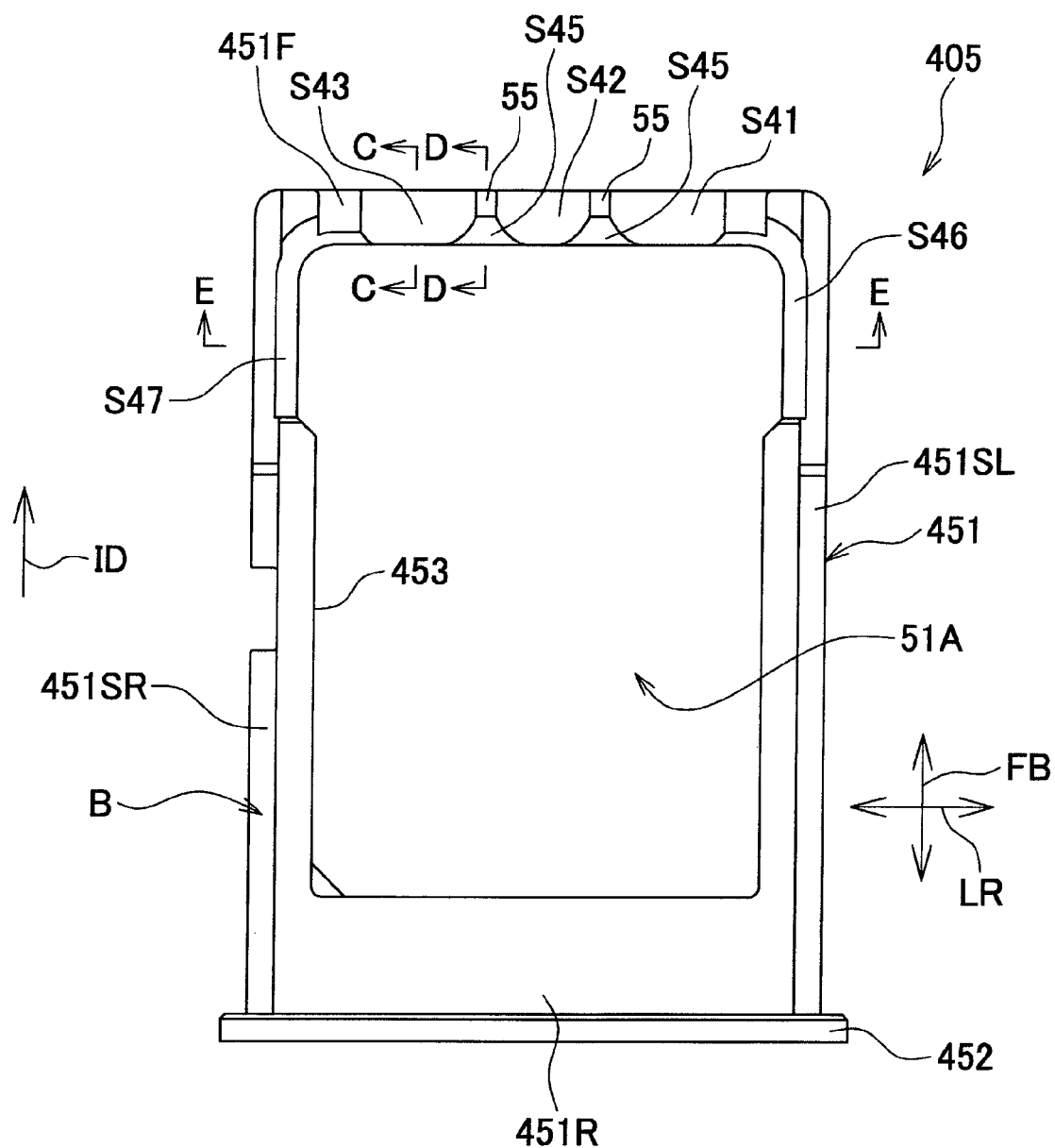
FIG. 34 is a view of a reverse surface of the card holder shown in FIG. 33.
Figure 35:
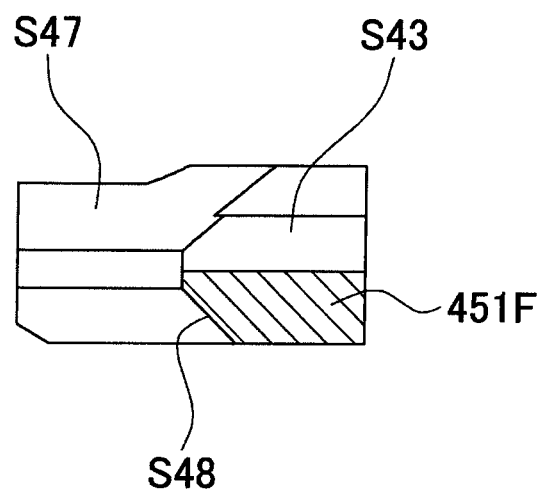
FIG. 35 is a cross-sectional view taken along C-C in FIG. 34.
Figure 36:
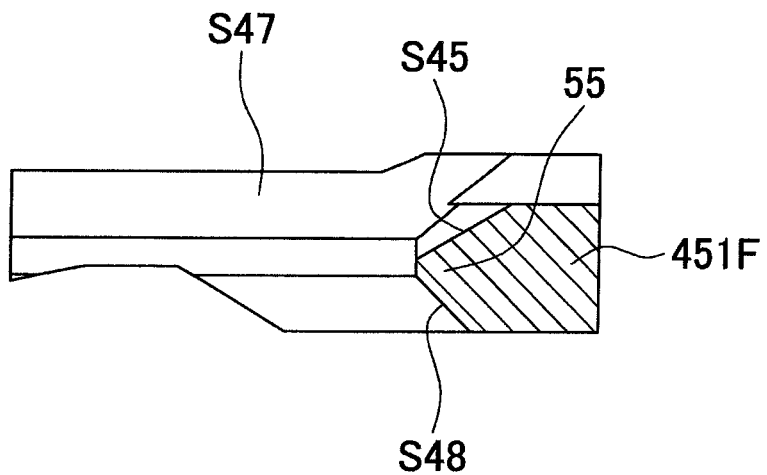
FIG. 36 is a cross-sectional view taken along D-D in FIG. 34.
Figure 37:
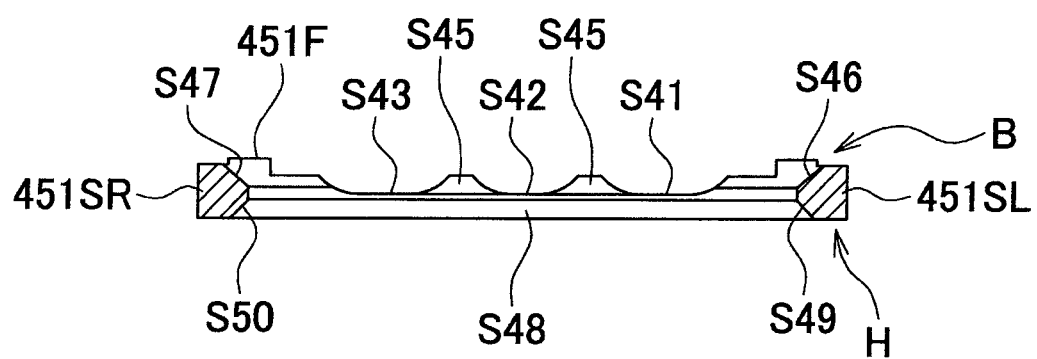
FIG. 37 is a cross-sectional view taken along E-E in FIG. 34.
Figure 38:
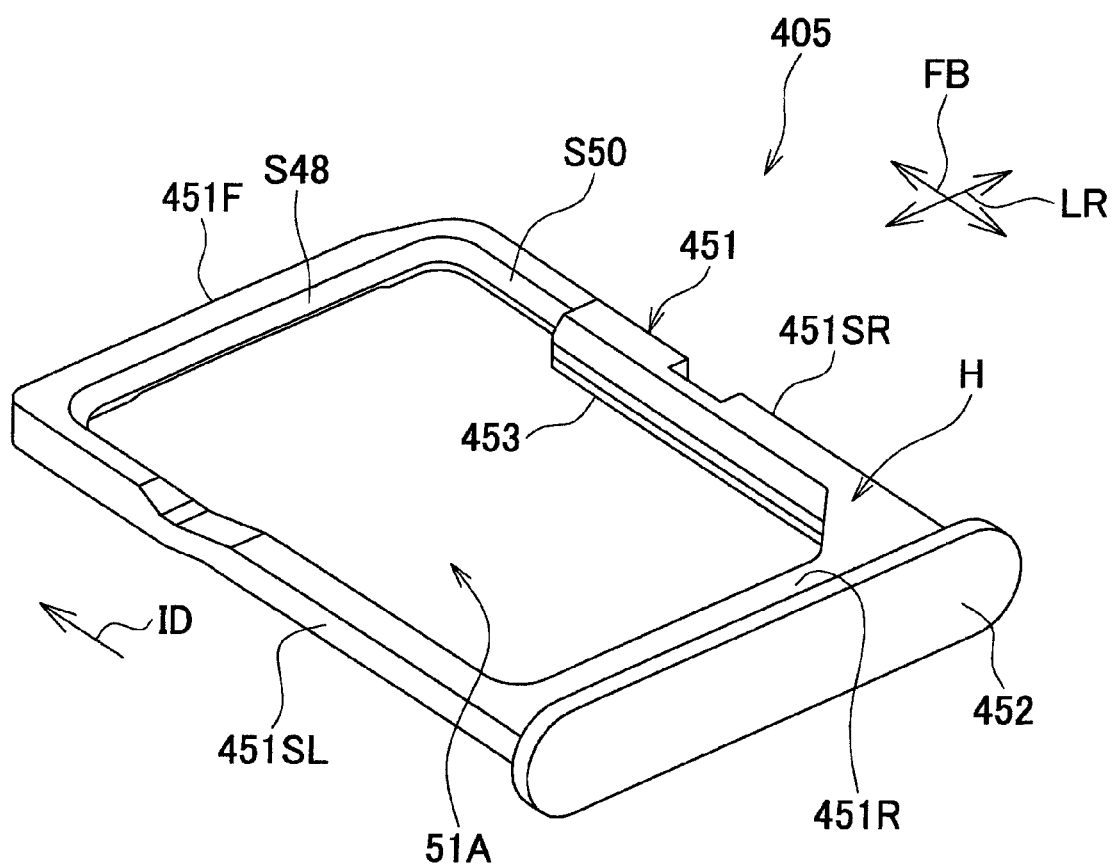
FIG. 38 is a perspective view of a front surface side of the card holder shown in FIG. 33.

As shown in FIG. 34, the front side of the side portion 451SR of the frame portion 451 is formed with an inclined portion (deformation suppressing portion) S47. The inclined portion S47 is inclined in the left-right direction LR. The front side of the side portion 451SL of the frame portion 451 is formed with an inclined portion (deformation suppressing portion) S46. The inclined portion S46 is inclined in the left-right direction LR. The inclined portions S46 and S47 function in the same manner as the inclined portions S6 and S7 of the first embodiment.

Note that an area in which the front portion 451F, the front side of the side portion 451SR, and the front side of the side portion 451SL of the frame portion 451 are located corresponds to the front side of the frame portion 451.

Next, the deformation suppressing portions on the front surface H of the frame portion 451 will be described. The front portion 451F of the frame portion 451 is formed with an inclined portion (deformation suppressing portion) S48. The inclined portion S48 is inclined in the front-rear direction FB (see FIGS. 35, 36, and 38).

The front side of the side portion 451SL of the frame portion 451 is formed with an inclined portion (deformation suppressing portion) S49. The inclined portion S49 is inclined in the left-right direction LR. The front side of the side portion 451SR of the frame portion 451 is formed with an inclined portion (deformation suppressing portion) S50. The inclined portion S50 is inclined in the left-right direction LR.

The inclined portion S48 functions in the same manner as the inclined portions S1, S2, S3, S4, and S5 of the first embodiment. The inclined portion S49 functions in the same manner as the inclined portion S6 of the first embodiment. The inclined portion S50 functions in the same manner as the inclined portion S7 of the first embodiment.

According to the fourth embodiment, since the grooves S41, S42, and S43, and the inclined portions S45, S46, and S47 are provided on the reverse surface B of the frame portion 451 as the deformation suppressing portions, and the inclined portions S48, S49, and S50 are provided on the front surface H of the frame portion 451 as the deformation suppressing portions, even when the card holder 405 is erroneously inserted upside down, it is possible to reduce damage of the contact portions 6A of the contacts 6 similarly to a case where the card holder 405 is correctly inserted (a case where the card holder 405 is inserted with the reverse surface B of the card holder 405 facing downward).

Although in the above-described embodiments, the inclined portion S1, etc., and the groove S41, etc. are employed as the deformation suppressing portions, the suppressing portions may have any other shape than the inclined portion S1 and the groove S41, etc., insofar as it is a shape which suppresses deformation of the contact portions 6A of the contacts 6. For example, a curved surface, such as a recessed shape or a protruding shape, may be employed.

It is further understood by those skilled in the art that the foregoing are the preferred embodiments of the present invention, and that various changes and modification may be made thereto without departing from the spirit and scope thereof.

What is claimed is:

1. A connector that electrically connects between a plate-like connection object and another connection object, the connector comprising:
   a holder that includes a frame portion forming a plate-like connection object-accommodating portion for accommodating the plate-like connection object; and
   a connector main body that is mountable on the other connection object, and that includes a holder accommodating portion for accommodating said holder,
   wherein said connector main body further includes a housing and plural contacts that are held in said housing,
   wherein each of said plural contacts includes:
      a connection portion that is connectable to the other connection object; and
      a contact portion that protrudes into said holder accommodating portion, and that is adapted to be brought into contact with the plate-like connection object accommodated in said plate-like connection object-accommodating portion when said holder is accommodated in said holder accommodating portion,
   wherein said frame portion is provided with plural deformation suppressing portions for suppressing deformation of said contact portions, caused when said holder is inserted into or extracted from said holder accommodating portion, and
   wherein said plural deformation suppressing portions include inclined portions that are inclined in a front-rear direction or in a left-right direction of said frame portion, as viewed in a holder inserting direction in which said frame portion is inserted into said holder accommodating portion.

2. The connector according to claim 1, wherein said plural deformation suppressing portions are provided on a front side of said frame portion in the holder inserting direction in which said holder is inserted into said holder accommodating portion.

3. The connector according to claim 1, wherein said plural deformation suppressing portions are provided on both a front side and a rear side of said frame portion in the holder inserting direction in which said holder is inserted into said holder accommodating portion.

4. The connector according to claim 1, wherein said plural deformation suppressing portions are provided on both a front surface and a reverse surface of said frame portion.

5. The connector according to claim 2, wherein said plural deformation suppressing portions are provided on both a front surface and a reverse surface of said frame portion.

6. The connector according to claim 1, wherein said plural deformation suppressing portions include, in addition to said inclined portions, grooves which are semi-circular in cross-section and extend in the front-rear direction.

7. The connector according to claim 2, wherein said plural deformation suppressing portions include, in addition to said inclined portions, grooves which are semi-circular in cross-section and extend in the front-rear direction.

8. The connector according to claim 1, wherein said holder includes a spring portion that is adapted to support the plate-like connection object by urging the plate-like connection object accommodated in said plate-like connection object-accommodating portion against an inner peripheral surface of said frame portion.

9. The connector according to claim 2, wherein said holder includes a spring portion that is adapted to support the plate-like connection object by urging the plate-like connection object accommodated in said plate-like connection object-accommodating portion against an inner peripheral surface of said frame portion.

10. The connector according to claim 8, wherein said spring portion is plate-shaped, and is provided with a spring portion-side inclined portion at a location close to a free end thereof, for guiding the plate-like connection object out of said plate-like connection object-accommodating portion when the plate-like connection object is obliquely accommodated into said plate-like connection object-accommodating portion.

11. The connector according to claim 9, wherein said spring portion is plate-shaped, and is provided with a spring portion-side inclined portion at a location close to a free end thereof, for guiding the plate-like connection object out of said plate-like connection object-accommodating portion when the plate-like connection object is obliquely accommodated into said plate-like connection object-accommodating portion.

12. The connector according to claim 1, wherein said holder includes a supporting portion that is provided on said frame portion, for supporting a peripheral portion of the plate-like connection object accommodated in said plate-like connection object-accommodating portion.

13. The connector according to claim 2, wherein said holder includes a supporting portion that is provided on said frame portion, for supporting a peripheral portion of the plate-like connection object accommodated in said plate-like connection object-accommodating portion.

14. The connector according to claim 1, wherein said holder includes a bottom portion that is provided on said frame portion, and is adapted to oppose the plate-like connection object accommodated in said plate-like connection object-accommodating portion.

15. The connector according to claim 2, wherein said holder includes a bottom portion that is provided on said frame portion, and is adapted to oppose the plate-like connection object accommodated in said plate-like connection object-accommodating portion.

16. The connector according to claim 1, wherein said holder includes an operation portion that is provided on a rear side of said frame portion in the holder inserting direction in which said frame portion is inserted into said holder accommodating portion, for inserting and extracting said frame portion into and out of said holder accommodating portion, and
   wherein a recess for hooking a jig for extracting said frame portion out of said holder accommodating portion is formed in a vicinity of said operation portion.

17. The connector according to claim 2, wherein said holder includes an operation portion that is provided on a rear side of said frame portion in the holder inserting direction in which said frame portion is inserted into said holder accommodating portion, for inserting and extracting said frame portion into and out of said holder accommodating portion, and
   wherein a recess for hooking a jig for extracting said frame portion out of said holder accommodating portion is formed in a vicinity of said operation portion.

* * * * *